(12) United States Patent
Endo et al.

(10) Patent No.: US 11,999,849 B2
(45) Date of Patent: Jun. 4, 2024

(54) BIAXIALLY ORIENTED POLYAMIDE FILM AND POLYAMIDE FILM MILL ROLL

(71) Applicant: TOYOBO CO., LTD., Osaka (JP)

(72) Inventors: Takuro Endo, Inuyama (JP); Kosuke Hama, Inuyama (JP)

(73) Assignee: TOYOBO CO., LTD., Osaka (JP)

(*) Notice: Subject to any disclaimer, the term of this patent is extended or adjusted under 35 U.S.C. 154(b) by 578 days.

(21) Appl. No.: 17/281,638

(22) PCT Filed: Sep. 27, 2019

(86) PCT No.: PCT/JP2019/038212
§ 371 (c)(1),
(2) Date: Mar. 31, 2021

(87) PCT Pub. No.: WO2020/071280
PCT Pub. Date: Apr. 9, 2020

(65) Prior Publication Data
US 2021/0395519 A1 Dec. 23, 2021

(30) Foreign Application Priority Data

Oct. 5, 2018 (JP) .................. 2018-190039
Oct. 5, 2018 (JP) .................. 2018-190040
(Continued)

(51) Int. Cl.
C08L 77/02 (2006.01)
B29C 55/12 (2006.01)
(Continued)

(52) U.S. Cl.
CPC .............. C08L 77/02 (2013.01); B29C 55/12 (2013.01); B29C 55/14 (2013.01); C08J 5/18 (2013.01);
(Continued)

(58) Field of Classification Search
CPC ...... C08L 77/02; C08L 2203/16; C08L 77/06; B29C 55/12; B29C 55/14; B29C 55/18;
(Continued)

(56) References Cited

U.S. PATENT DOCUMENTS 5,718,965 A 2/1998 Shiroeda et al.
5,968,665 A 10/1999 Shiroeda et al.
(Continued)

FOREIGN PATENT DOCUMENTS

CN 101327646 A 12/2008
CN 102239204 A 11/2011
(Continued)

OTHER PUBLICATIONS

Machine translation of JP 2004-090527. (Year: 2004).*
(Continued)

Primary Examiner — John D Freeman
(74) Attorney, Agent, or Firm — Leydig, Voit & Mayer, Ltd.

(57) ABSTRACT

To provide a biaxially oriented polyamide film, even as a product that is close to an end of a mill roll, having favorable mechanical characteristics, thermal characteristics, and few S-shape curling due to moisture absorption after being made into a bag. A biaxially oriented polyamide film formed of a polyamide resin containing not lower than 60% by mass of polyamide 6, wherein a molecular orientation angle of the film is not smaller than 20°, a strain at moisture absorption of the film is not higher than 1.3%, an impact strength of the film is not lower than 0.8 J/15 μm, and a heat shrinkage rate, after heating for ten minutes at 160° C., of the film is 0.6 to 3.0% in both an MD direction and a TD direction.

10 Claims, 2 Drawing Sheets

(30) Foreign Application Priority Data

Oct. 18, 2018 (JP) ................................. 2018-196702
Oct. 18, 2018 (JP) ................................. 2018-196703

(51) Int. Cl.
| | |
|---|---|
| *B29C 55/14* | (2006.01) |
| *C08J 5/18* | (2006.01) |
| *B29K 77/00* | (2006.01) |

(52) U.S. Cl.
CPC .. *B29K 2077/00* (2013.01); *B29K 2995/0053* (2013.01); *C08J 2377/00* (2013.01); *C08L 2203/16* (2013.01)

(58) Field of Classification Search
CPC ................ B29D 7/01; B65H 18/28; B65H 2301/41484; B29K 2077/00; B29K 2995/0053; C08J 2377/00; C08J 5/18; C09J 2477/006; C09J 7/25; C09J 7/00; C09J 133/08; C09J 167/02; C09J 175/04; C08G 18/0823; C08G 18/10; C08G 18/4222; C08G 18/4252; C09D 175/06; B29L 2007/008
See application file for complete search history.

(56) References Cited

U.S. PATENT DOCUMENTS

| | | | |
|---|---|---|---|
| 2008/0119633 | A1 | 5/2008 | Nishi et al. |
| 2011/0236635 | A1 | 9/2011 | Shimizu et al. |
| 2013/0323485 | A1 | 12/2013 | Shimizu et al. |
| 2014/0329078 | A1 | 11/2014 | Miyaguchi et al. |
| 2015/0064485 | A1 | 3/2015 | Shimizu et al. |
| 2021/0395519 | A1 | 12/2021 | Endo et al. |

FOREIGN PATENT DOCUMENTS

| | | | |
|---|---|---|---|
| CN | 103402737 | A | 11/2013 |
| JP | H08-174663 | A | 7/1996 |
| JP | 2623939 | B2 | 6/1997 |
| JP | 2001-247133 | A | 9/2001 |
| JP | 2004-090527 | A | 3/2004 |
| JP | 2004-137394 | A | 5/2004 |
| JP | 3726304 | B2 | 12/2005 |
| JP | 2006015742 | A * | 1/2006 |
| JP | 2006-088690 | A | 4/2006 |
| JP | 2008-105362 | A | 5/2008 |
| JP | 2010-131809 | A | 6/2010 |
| JP | 2012-254804 | A | 12/2012 |
| WO | WO 2020/071280 | A1 | 4/2020 |

OTHER PUBLICATIONS

European Patent Office, Extended European Search Report in European Patent Application No. 19869891.2 (Jun. 13, 2022).
Intellectual Property India, Examination Report in Indian Patent Application No. 202147018582 (Jun. 10, 2022).
Japan Patent Office, Third-Party Submission in Japanese Patent Application No. 2020-193652 (Jun. 27, 2023).
Japan Patent Office, Third-Party Submission in Japanese Patent Application No. 2020-193653 (Jun. 30, 2023).
Japan Patent Office, Office Action in Japanese Patent Application No. 2020-193652 (Jul. 25, 2023).
Japan Patent Office, Office Action in Japanese Patent Application No. 2020-193653 (Jul. 25, 2023).
Japanese Patent Office, Office Action in Japanese Patent Application No. 2019-570587 (Mar. 10, 2020).
Japanese Patent Office, Decision of Rejection in Japanese Patent Application No. 2019-570587 (Sep. 1, 2020)).
Japanese Patent Office, International Search Report in International Patent Application No. PCT/JP2019/038212 (Dec. 24, 2019).
China National Intellectual Property Administration, First Office Action in Chinese Patent Application No. 201980064517.8 (Mar. 21, 2022).
Toyobo Co., Ltd. Technical Information: "How Are Biaxially Stretched Nylon Films (hereinafter ONY films) Made?" [accessed at https://www.toyobo.co.jp/seihin/film/package/jouhoukyoku/001/onyfilm.html] (2023).
Japan Patent Office, Notice of Submission of Publications in Japanese Patent Application No. 2020-193652 (Oct. 13, 2023).
Japan Patent Office, Notice of Submission of Publications in Japanese Patent Application No. 2020-193653 (Oct. 13, 2023).
Japan Patent Office, Office Action in Japanese Patent Application No. 2020-193652 (Oct. 31, 2023).
Japan Patent Office, Office Action in Japanese Patent Application No. 2020-193653 (Oct. 31, 2023).

* cited by examiner

BIAXIALLY ORIENTED POLYAMIDE FILM AND POLYAMIDE FILM MILL ROLL

CROSS-REFERENCE TO RELATED APPLICATIONS

This patent application is the U.S. national phase of International Patent Application No. PCT/JP2019/038212, filed Sep. 27, 2019, which claims the benefit of Japanese Patent Application No. 2018-190039, filed Oct. 5, 2018, Japanese Patent Application No. 2018-190040, filed Oct. 5, 2018, Japanese Patent Application No. 2018-196702, filed Oct. 18, 2018, and Japanese Patent Application No. 2018-196703, filed Oct. 18, 2018, which are incorporated by reference in their entireties herein.

TECHNICAL FIELD

The present invention relates to a biaxially oriented amide film used for packaging food and the like and having excellent impact resistance and pinhole resistance. In particular, the present invention relates to a biaxially oriented polyamide film that experiences few S-shape curling phenomena caused by moisture absorption if a film close to an end in the transverse direction of a mill roll is processed into a bag for packaging food.

BACKGROUND ART

In general, biaxially oriented polyamide films have excellent mechanical characteristics, thermal characteristics, and gas barrier characteristics, and thus are widely used as materials for packaging various kinds of food and the like. However, conventional biaxially oriented polyamide films are elongated owing to moisture absorption in a high-humidity environment. Thus, if the films are processed into bags, the bags curl in S-shapes owing to moisture absorption. Consequently, problems arise in that: the bags are not easily boxed; and a malfunction occurs at a conveying portion of a device for filling the bags with contents.

Such problems are likely to arise if a bag is made of a slit roll film close to an end of a mill roll. Here, the mill roll refers to a film roll that is wound after ears at both ends are trimmed in a film manufacturing process and that extends over the entire width of a film manufacturing device. The slit roll refers to a film roll obtained by slitting the mill roll so as to have a smaller width in order to perform printing processing, lamination processing, or the like.

The above-described polyamide film used for the purpose of packaging food ordinarily has a surface subjected to printing and then is laminated with a polyolefin-based resin film made of polyethylene (PE), polypropylene (PP), or the like. The resultant laminate is folded in half parallelly in the machine direction with the polyamide film facing outward, has three sides thermally fused, and is cut, thereby being made into a three-side sealed bag having one side in an opened state. Then, the bag is filled with content, tightly sealed, and supplied to the market.

Such a polyamide film used for the purpose of packaging food is manufactured mainly by a biaxial stretch method. However, the biaxially oriented polyamide film manufactured by the biaxial stretch method is prone to variations in physical properties in the transverse direction of the film. One cause of the variations in physical properties in the transverse direction is considered to be a bowing phenomenon. The bowing phenomenon is considered as a phenomenon in which, when temperature rise occurs in a heat-fixing treatment process and shrinkage stress is generated in a machine direction, both end portions of a film are held and bound with clips whereas a center portion of the film shrinks owing to weak binding force, so that a main axis of orientation is tilted in a bow shape in the transverse direction.

Owing to the bowing phenomenon, a main axis (an angle at which a largest value is obtained) for physical property values such as a heat shrinkage rate, a rate of dimensional change due to moisture absorption, and a refractive index varies in the transverse direction of the film. This leads to increases in the physical property value differences of the heat shrinkage rate and the rate of dimensional change due to moisture absorption in a diagonal direction.

That is, if a bag is made of a biaxially oriented polyamide film for packaging food obtained by a conventional method, the main axis direction of the orientation differs between outside and inside of the bag folded in half owing to the bowing phenomenon. Thus, the dimensional change also differs between the outside and the inside, whereby warpage occurs at a corner of the bag. That is, a phenomenon in which two sides of the bag curl in S-shapes (hereinafter, simply referred to also as S-shape curling) occurs. Consequently, it may become difficult to put the bag in a box when boxing the bag, and a malfunction may occur at a conveying portion of a device for filling the bag with content.

As a measure against the bowing phenomenon, a method has been proposed in which misalignment due to moisture absorption is reduced by a polyamide film that is obtained by performing transverse stretch, then cooling, and then heat setting and that satisfies a specific relationship between a shrinkage strain in boiling water and a difference in molecular orientation angle (see Patent Literature 1). However, a bag made of a slit roll that is a film close to an end of a mill roll may experience S-shape curling due to moisture absorption.

In addition, a method has been proposed in which S-shape curling after treatment with boiling water is reduced by a biaxially orientated polyamide-based resin film that is characterized by being obtained by stretch in a machine direction in two stages and that has an α-type crystal orientation main axis direction not larger than 14 degrees relative to the machine direction or a transverse direction of the film (see Patent Literature 2).

However, even with this method, a bag made of a slit roll that is a film close to an end of a mill roll may experience S-shape curling due to moisture absorption. The reason for this is considered to be because the measure taken in Patent Literature 2 is a measure against S-shape curling phenomena that occur after bags are treated with boiling water, and is not a measure against S-shape curling phenomena due to moisture absorption.

Against the problem of S-shape curling phenomena due to moisture absorption, a packaging bag is proposed in which an acute angle formed by main orientation axis directions of biaxially stretched polyamide film layers on the outside and the inside of the packaging bag is not larger than 30° (see Patent Literature 3). However, in this method, although a bag made of a roll film having been slit from near the center of a mill roll has a small angle formed by the main orientation axis directions of the polyamide film layers on the outside and the inside and thus experiences few S-shape curling due to moisture absorption, a bag close to an end of the mill roll has a large angle formed by the main orientation axis directions of the polyamide films on the outside and the inside, and thus occurrence of S-shape curling due to moisture absorption cannot be reduced.

CITATION LIST

Patent Literature

[PTL 1] Japanese Patent No. 2623939
[PTL 2] Japanese Patent No. 3726304
[PTL 3] Japanese Laid-Open Patent Publication No. 2012-254804

SUMMARY OF THE INVENTION

Problems to be Solved by the Invention

The present invention is made in view of the above-described problems, and an object of the present invention is to provide a biaxially oriented polyamide film and a film mill roll that each experience few S-shape curling due to moisture absorption, even as a packaging bag made by using a film product that is close to an end of the mill roll.

Solution to the Problems

The inventors of the present application have finally arrived at the present invention as a result of thorough research for solving the above-described problems.

The present invention includes the following features.

[1] A biaxially oriented polyamide film formed of a polyamide resin containing not lower than 60% by mass of polyamide 6, wherein a molecular orientation angle of the film is not smaller than 20°, a strain at moisture absorption of the film is not higher than 1.3%, an impact strength of the film is not lower than 0.8 J/15 μm, and a heat shrinkage rate, after heating for ten minutes at 160° C., of the film is 0.6 to 3.0% in both an MD direction and a TD direction.

[2] The biaxially oriented polyamide film according to [1], wherein the biaxially oriented polyamide film is formed of a polyamide resin containing not lower than 90% by mass of polyamide 6.

[3] The biaxially oriented polyamide film according to [1] or [2], wherein a strain at thermal shrinkage, after heating for ten minutes at 160° C., of the film is not higher than 2.0%.

[4] The biaxially oriented polyamide film according to any one of claims 1 to 3, wherein the biaxially oriented polyamide film comprises, on at least one surface thereof, an easily adhesive layer having a coating amount of 0.01 to 3 g/m$^2$ in terms of solid content and formed of any of a polyester resin, a polyurethane resin, and/or a polyacrylic resin.

[5] A polyamide film mill roll of a biaxially oriented polyamide film formed of a polyamide resin containing not lower than 60% by mass of polyamide 6, wherein an impact strength at each of positions of the film that are inward by 300 mm from a right end and a left end in a transverse direction of the film mill roll is not lower than 0.8 J/15 μm, a strain at moisture absorption at each position is not higher than 1.3%, and a heat shrinkage rate, after heating for ten minutes at 160° C., at each position is 0.6 to 3.0% in both an MD direction and a TD direction.

[6] The polyamide film mill roll according to claim 5, wherein the biaxially oriented polyamide film comprises, on at least one surface thereof, an easily adhesive layer having a coating amount of 0.01 to 3 g/m$^2$ in terms of solid content and formed of any of a polyester resin, a polyurethane resin, and/or a polyacrylic resin.

[7] The polyamide film mill roll according to [5] or [6], wherein a strain at thermal shrinkage, after heating for ten minutes at 160° C., at each of the positions of the film that are inward by 300 mm from the right end and the left end in the transverse direction of the film mill roll is not higher than 2.0%.

Advantageous Effects of the Invention

Each of the biaxially oriented polyamide film and the film mill roll of the present invention has a low elongation anisotropy under high humidity and a low dimensional strain between before and after moisture absorption, even as a film portion that is close to an end of the mill roll. Consequently, S-shape curling of a processed bag can be reduced. Thus, when the bag is filled with content, a malfunction is less likely to occur at conveyance of the bag or the like, and workability is favorable. Furthermore, a shrinkage strain at high temperature is also low, and thus shrinkage deformation after the bag is heat-sealed is also low. Therefore, the present invention can be suitably used for various kinds of packaging purposes.

Figure 1:
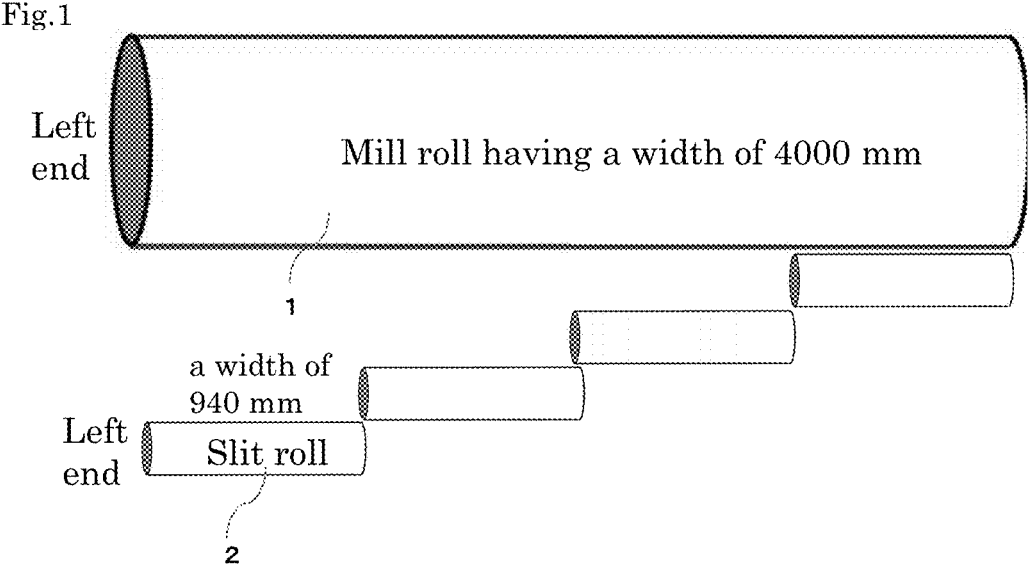
FIG. 1 is a schematic view of a slit roll used for evaluation of S-shape curling.
Figure 2:
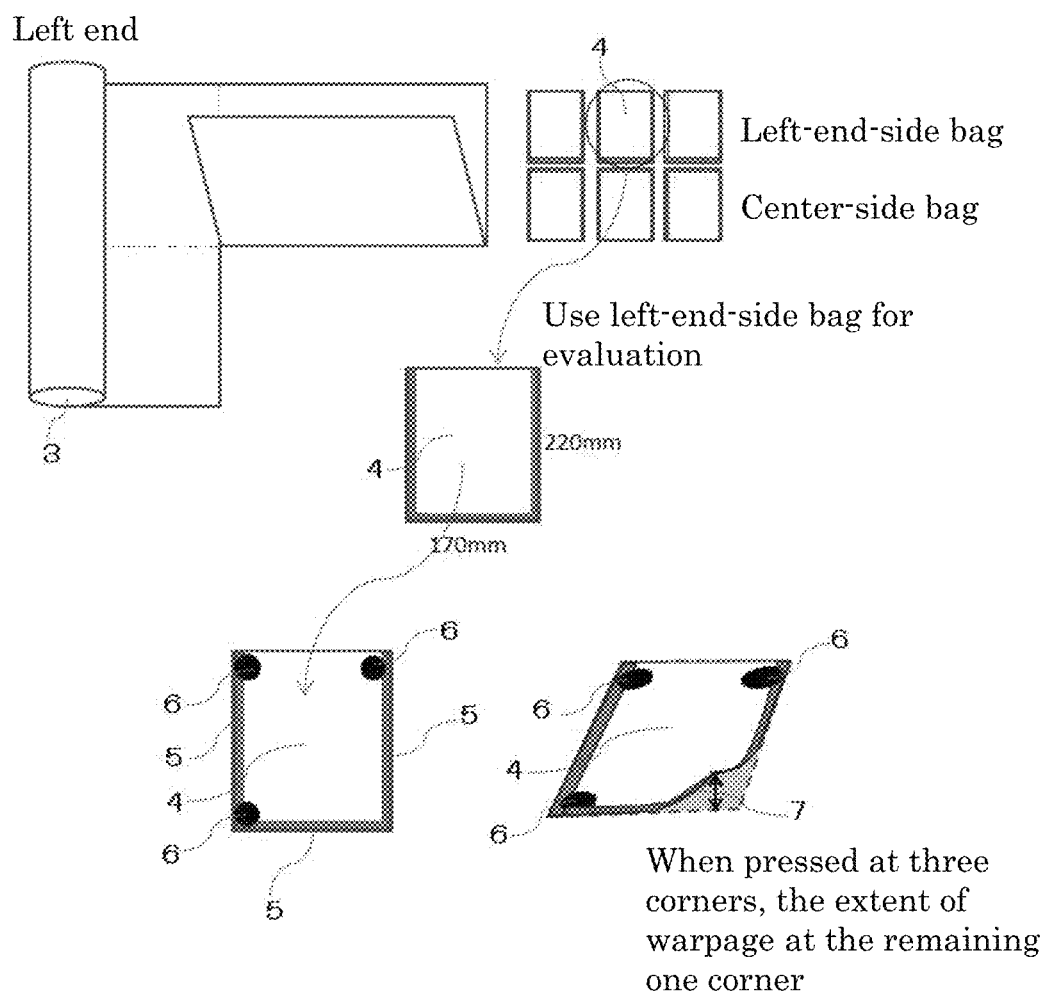
FIG. 2 is a schematic view for evaluation of S-shape curling of a bag.

DESCRIPTION OF THE REFERENCE CHARACTERS 1 mill roll (width: 4000 mm) of biaxially oriented polyamide film
2 slit roll (width: 940 mm) at left end
3 laminated roll obtained by laminating slit roll film at left end with sealant
4 three-side sealed bag at left end
5 heat-sealed portion of three-side sealed bag
6 weight for measuring warpage
7 height of warpage indicating extent of S-shape curling

DESCRIPTION OF EMBODIMENTS

Hereinafter, an embodiment of the present invention will be described in detail.

[Raw Material Composition of Biaxially Oriented Polyamide Film]

A biaxially oriented polyamide film of the present invention is formed of a polyamide resin having a polyamide 6 content that is preferably not lower than 60% by mass, more preferably not lower than 80% by mass, and further preferably not lower than 90% by mass. A content lower than 60% by mass leads to deterioration of mechanical strength, thermal dimensional stability, and the like, and thus is not preferable.

The polyamide 6 in the present invention is ordinarily made through ring-opening polymerization of ε-caprolactam. The polyamide 6 obtained through ring-opening polymerization is ordinarily subjected to removal of the ε-caprolactam monomer thereof by using hot water, then dried, and then melt-extruded with an extruder.

As the polyamide 6 used in the present invention, polyamides 6 commercially available from UBE INDUSTRIES, LTD., BASF CORPORATION, and the like may be used. A particularly preferable polyamide 6 is one that: is commercially available for films; has the following relative viscosity and a remaining lactam monomer content not higher than 1% by mass; has ends capped or modified; and is less likely to allow a lactam monomer to be generated at the time of melting.

The relative viscosity of the polyamide 6 in the present invention is preferably 1.8 to 4.5 and more preferably 2.6 to 3.6. If the relative viscosity is lower than 1.8, the impact resistance strength of the film is insufficient. If the relative viscosity is higher than 4.5, a load on the extruder increases, and it becomes difficult to obtain an unstretched sheet.

The biaxially oriented polyamide film of the present invention may contain, apart from the polyamide 6 which is a main component, another thermoplastic resin for the purpose of improving stretchability, pinhole resistance, easiness of cutting, and the like. In addition, the biaxially oriented polyamide film may contain a small amount of additive such as an anti-blocking agent, a lubricant, an antistatic agent, a thermal stabilizer, and a light resisting agent.

Examples of the other thermoplastic resin other than the polyamide 6 used in the present invention include homopolymers and copolymers such as polyamide-based resins, polyester-based resins, polyolefin-based resins, acrylic-based resins, polycarbonate-based resins, polyvinyl-based resins, and urethane-based resins.

The biaxially oriented polyamide film may contain nylon MXD6, nylon 6I, or the like in order to improve stretchability.

The biaxially oriented polyamide film may contain a polyamide elastomer, a polyester elastomer, a polyolefin elastomer, or the like in order to improve pinhole resistance.

Examples of the anti-blocking agent used in the present invention include: inorganic fine particles of silica, kaolin, zeolite, and the like; and crosslinked polymeric fine particles of acryl, polystyrene, and the like. It is noted that silica fine particles can be suitably used from the viewpoint of transparency and slipperiness.

Examples of the lubricant used in the present invention include organic lubricants such as ethylene bis stearamide (EBS) having an effect of lowering surface energy. The lubricant may be contained within a range that does not cause any problem regarding adhesiveness and wettability.

Use of the anti-blocking agent and the lubricant together can cause excellent slipperiness and transparency to be concurrently imparted to the film, and thus is preferable.

[Easily Adhesive Layer of Biaxially Oriented Polyamide Film]

The biaxially oriented polyamide film of the present invention is preferably provided with an easily adhesive layer that has a coating amount of 0.01 to 3 g/m$^2$ in terms of solid content and that is formed of any of a polyester resin, a polyurethane resin, and/or a polyacrylic resin.

The easily adhesive layer is provided by coating and drying a coating liquid before the film is wound as a mill roll in a film manufacturing process.

The coating liquid can be coated on an unstretched film, a uniaxially stretched film, and/or a biaxially stretched film. In the case of manufacturing the film by a sequential biaxial stretch method, the coating liquid is ordinarily coated and dried on a uniaxially stretched film. In the case of manufacturing the film by simultaneous biaxial stretch, the coating liquid is ordinarily coated and dried on a stretched film with no axially stretching.

As the coating liquid for providing the easily adhesive layer in the present invention, since the coating liquid for the providing is coated and dried before the film is wound as a mill roll in a film manufacturing process, a water-based dispersion or an aqueous solution of a resin is preferably used in order to ensure safety and hygiene in manufacturing.

[Polyester Resin Used for Easily Adhesive Layer]

In the case of providing a polyester resin for the easily adhesive layer, a copolymerized polyester-based resin can be selected as the polyester resin. The copolymerized polyester-based resin refers to a polycondensate of a dicarboxylic acid component, a diol component, and another ester forming component. Examples of the dicarboxylic acid component contained as a component in the copolymerized polyester-based resin can include: aromatic dicarboxylic acids such as terephthalic acid, isophthalic acid, 2,6-naphthalenedicarboxylic acid, 4,4'-biphenylenedicarboxylic acid, and 5-sodium sulfoisophthalic acid; aliphatic dicarboxylic acids such as succinic acid, adipic acid, azelaic acid, and sebacic acid; alicyclic dicarboxylic acids such as 1,4-cyclohexanedicarboxylic acid and 1,2-cyclohexanedicarboxylic acid; unsaturated dicarboxylic acids such as maleic acid, fumaric acid, and tetrahydrophthalic acid; and the like.

Besides the above-described dicarboxylic acid components, salts of 5-sulfoisophthalic acid, sulfoterephthalic acid, 4-sulfoisophthalic acid, 4-sulfonaphthalene-2,6-dicarboxylic acid, and 5(4-sulfophenoxy)isophthalic acid can be used to impart water dispersibility. Among them, 5-sodium sulfoisophthalic acid is preferably used within a range of 1 to 10 mol %.

Examples of the diol component contained in the copolymerized polyester-based resin can include: aliphatic diols such as ethylene glycol, diethylene glycol, propylene glycol, 1,3-propanediol, 1,4-butanediol, neopentyl glycol, 1,6-hexanediol, and polyethylene glycol; alicyclic diols such as 1,4-cyclohexane dimethanol; aromatic diols such as 4,4'-bis (hydroxyethyl)bisphenol A; further, bis(polyoxyethylene glycol)bisphenol ether; and the like.

[Polyurethane Resin Used for Easily Adhesive Layer]

In the case of providing a polyurethane resin for the easily adhesive layer in the present invention, examples of the polyurethane resin include polyurethane resins each obtained by reacting a polyol having two or more active hydrogen atoms and an organic polyisocyanate with each other.

Examples of the polyol can include: saturated polyester polyols; polyether polyols (for example, polyethylene glycol, polytetramethylene glycol, and the like); amino alcohols (for example, ethanolamine, diethanolamine, triethanolamine, and the like); and polyols having unsaturated double bonds, such as unsaturated polyester polyols (for example, unsaturated polyester polyols each obtained by polycondensation of: an unsaturated polycarboxylic acid alone or a mixture of the unsaturated polycarboxylic acid and a saturated polycarboxylic acid; and a mixture of a saturated polyhydric alcohol and an unsaturated polyhydric alcohol), polybutadiene polyols (for example, 1,2-polybutadiene polyol, 1,4-polybutadiene polyol, and the like), and acrylic polyols (acrylic polyols each obtained by copolymerization of any kind of acrylic-based monomer and an acrylic acid-based monomer with a hydroxyl group, and having the hydroxyl group in a side chain of the acrylic polyol).

Examples of the organic polyisocyanate can include: aromatic polyisocyanates (for example, diphenylmethane diisocyanate, toluene diisocyanate, and the like); aliphatic polyisocyanates (for example, hexamethylene diisocyanate and the like); alicyclic polyisocyanates (for example, isophorone diisocyanate and the like); aromatic/aliphatic polyisocyanates (for example, xylylene diisocyanate); and further, polyisocyanates obtained by reacting these isocyanates and low-molecular-weight polyols with each other in advance.

The polyurethane resin can be produced by a publicly-known method. At the time of production, two or more unreacted isocyanate groups need to be present in a generated prepolymer. The isocyanate groups are preferably blocked, and the blocking is essential particularly when a water-based coating liquid is prepared. The blocking is well known as blocking of isocyanate, and free isocyanate groups can be regenerated by heating. Examples of blocking agents can include bisulfite salts, alcohols, oximes, active methylene compounds, imidazoles, lactams, imine compounds, amide compounds, imide compounds, and the like.

The isocyanate groups in the polyurethane prepolymer and these blocking agents can be reacted with each other at a temperature from normal temperature to 100° C., and a urethanization catalyst can be used as necessary. Here, in order to impart stable water dispersibility and water solubility to the polyurethane prepolymer, a hydrophilic group may be introduced into the molecule. The hydrophilic group is exemplified by —$SO_3M$ (where M represents an alkali metal or an alkali earth metal), —OH, —COOR (where R represents an ammonia residue or tertiary amine residue), and the like. Among them, a carboxyl group neutralized with ammonia or a tertiary amine is particularly preferable. A carboxyl group neutralized with ammonia or a tertiary amine is introduced into the polyurethane prepolymer by, for example, a method such as: a method in which a carboxyl-group-containing polyhydroxy compound is used as one of reaction raw materials at the time of synthesizing the polyurethane prepolymer; or a method in which a hydroxy-group-containing carboxylic acid or an amino-group-containing carboxylic acid is reacted with unreacted isocyanate groups of the polyurethane prepolymer having the isocyanate groups, and then the product from the reaction is added into ammonia water or a tertiary amine aqueous solution during high-speed stirring, to cause neutralization.

[Polyacrylic Resin Used for Easily Adhesive Layer]

In the case of providing a polyacrylic resin for the easily adhesive layer in the present invention, examples of the polyacrylic resin include an acrylic polymer obtained by polymerizing acrylic acid, methacrylic acid, or a salt or an ester thereof.

Examples of the acrylic acid ester-based monomer and the methacrylic acid ester-based monomer can include methyl acrylate, ethyl acrylate, butyl acrylate, 2-ethylhexyl acrylate, 2-hydroxyethyl acrylate, glycidyl acrylate, methyl methacrylate, ethyl methacrylate, butyl methacrylate, 2-ethylhexyl methacrylate, 2-hydroxyethyl methacrylate, glycidyl methacrylate, and the like. Examples of the acrylic acid salt and the methacrylic acid salt include sodium acrylate, sodium methacrylate, potassium acrylate, potassium methacrylate, ammonium acrylate, ammonium methacrylate, and the like.

Besides these essential components, an acrylic acid-based monomer such as acrylamide, methacrylamide, aminoethyl methacrylate, aminomethyl methacrylate, N-methylolacrylamide, or N-methoxymethylacrylamide may be added.

Besides them, a monomer such as vinyl chloride, vinyl acetate, styrene, vinyl ether, butadiene, isoprene, or sodium vinyl sulfonate can also be used as a copolymerization component for the polyacrylic resin. It is noted that a hydrophilic component such as an acrylic acid salt component, a methacrylic acid salt component, an acrylic acid component, an acrylamide component, a 2-hydroxyethyl acrylate component, or an N-methylolacrylamide component is preferably contained as a copolymerization component in the acrylic polymer in order to improve the functionality of the coating film. Further, the acrylic polymer may be a copolymer that has a functional group in a side chain of the molecule. The acrylic-based polymer can be obtained also by: using a hard component such as methyl methacrylate or ethyl methacrylate as a main component; and copolymerizing a soft component such as an acrylic acid ester as a copolymerization component with the hard component.

[Acrylic Graft Copolymerized Polyester Water-Based Dispersion Used for Easily Adhesive Layer]

An acrylic graft copolymerized polyester water-based dispersion is particularly preferable as the resin used for the easily adhesive layer in the present invention. The acrylic graft copolymerized polyester water-based dispersion contains: particles of a grafted polyester; and water, a water-based solvent, or an organic solvent. The dispersion has an appearance that ranges from translucence to milky white. The grafted polyester has: a main chain formed of a polyester; and a graft moiety (side chain) formed by a polymer of radically polymerizable monomers including a radically polymerizable monomer that has a hydrophilic group.

The average particle diameter of the particles of the grafted polyester in the acrylic graft copolymerized polyester water-based dispersion measured by a laser light scattering method, is not larger than 500 nm, preferably 10 nm to 500 nm, and more preferably 10 nm to 300 nm. If the average particle diameter is larger than 500 nm, the strength of the coating film having been coated decreases.

The amount of the particles of the acrylic graft copolymerized polyester contained in the acrylic graft copolymerized polyester water-based dispersion is ordinarily 1% by mass to 50% by mass and preferably 3% by mass to 30% by mass.

The particles in the acrylic graft copolymerized polyester water-based dispersion that can be used in the present invention can have, in the aqueous dispersion medium, a core-shell structure in which the polyester main chain serves as a core.

The core-shell structure described herein refers, as is publicly known in this technical field, to a two-layer structure in which a core moiety formed of a polymer that is insoluble in a dispersion medium and that is in an aggregated state is enclosed by a shell moiety formed of a polymer that is soluble in the dispersion medium and that is in a dissolved state. This structure is known to be a structure that characteristically appears in a dispersion of a composite polymer generated by mutual chemical bonding of polymers having different solubilities in a dispersion medium, and that cannot appear by merely mixing the polymers having different solubilities in the dispersion medium. Further, a mere mixture of polymers having different solubilities in a dispersion medium cannot be present as a dispersion having particle diameters not larger than 500 nm.

If the particles in the acrylic graft copolymerized polyester water-based dispersion used in the present invention has the above-described core-shell structure, the dispersed state of the polymer particles in the dispersion medium is stabilized even without using an emulsifier or an organic cosolvent frequently used for conventional dispersions. This is because the resin of the shell moiety forms a sufficient hydration layer, to protect each dispersed polymer particle.

A coating film obtained from the above-described acrylic graft copolymerized polyester water-based dispersion has very excellent adhesiveness to the polyamide film. Further, the coating film has very excellent blocking resistance and thus can be used, without any problems, on a film base material that has a relatively low glass transition point. In addition, in the case of obtaining a layered product, the coating film also has very favorable adhesiveness to an adhesive used when a printing ink or a sealant layer is stacked. The obtained layered film (referred to also as a laminate film) can have significantly improved durability against retorting treatment and treatment with boiling water. Furthermore, if a flexible grafted polyester in which the glass transition temperature of the grafted polyester in the copolymerized polyester water-based dispersion is not higher than 30° C. and preferably not higher than 10° C. is used, the durability of the layered product is further improved.

[Polyester Main Chain of Acrylic Graft Copolymerized Polyester]

In the present invention, the polyester that can be used as the main chain of the grafted polyester is preferably a saturated or unsaturated polyester synthesized from at least a dicarboxylic acid component and a diol component. The obtained polyester can be one type of polymer or a mixture of two or more types of polymers. A polyester that itself is intrinsically not dispersed or dissolved in water, is preferable. The weight-average molecular weight of the polyester that can be used in the present invention is 5000 to 100000 and preferably 5000 to 50000. If the weight-average molecular weight is lower than 5000, coating film physical properties such as the post-processability of a dried coating film decrease. In addition, if the weight-average molecular weight is lower than 5000, the polyester serving as the main chain is itself easily dissolved in water, and thus the formed grafted polyester cannot form the core-shell structure described later. Meanwhile, if the weight-average molecular weight of the polyester is higher than 100000, dispersion in water becomes difficult. Thus, the weight-average molecular weight is preferably not higher than 100000 from the viewpoint of dispersion in water. The glass transition point of the polyester is not higher than 30° C. and preferably not higher than 10° C.

The above-described dicarboxylic acid component is preferably a dicarboxylic acid mixture that contains at least one type of aromatic dicarboxylic acid, at least one type of aliphatic and/or alicyclic dicarboxylic acid, and at least one type of dicarboxylic acid having a radically polymerizable unsaturated double bond. The dicarboxylic acid mixture contains: 30 to 99.5 mol % and preferably 40 to 99.5 mol % of the aromatic dicarboxylic acid; 0 to 70 mol % and preferably 0 to 60 mol % of the aliphatic and/or alicyclic dicarboxylic acid; and 0.5 to 10 mol %, preferably 2 to 7 mol %, and more preferably 3 to 6 mol % of the dicarboxylic acid having a radically polymerizable unsaturated double bond. If the amount of the contained dicarboxylic acid containing a radically polymerizable unsaturated double bond is lower than 0.5 mol %, the radically polymerizable monomers are less likely to be effectively grafted to the polyester, and the diameters of the dispersed particles in the water-based medium tend to increase, whereby dispersion stability tends to decrease.

As the aromatic dicarboxylic acid, terephthalic acid, isophthalic acid, orthophthalic acid, naphthalenedicarboxylic acid, biphenyldicarboxylic acid, and the like can be used. Further, 5-sodium sulfoisophthalic acid can also be used as necessary.

As the aliphatic dicarboxylic acid, succinic acid, adipic acid, azelaic acid, sebacic acid, dodecanedioic acid, dimer acid, acid anhydrides thereof, and the like can be used.

As the alicyclic dicarboxylic acid, 1,4-cyclohexanedicarboxylic acid, 1,3-cyclohexanedicarboxylic acid, 1,2-cyclohexanedicarboxylic acid, acid anhydrides thereof, and the like can be used.

Regarding the dicarboxylic acid containing a radically polymerizable unsaturated double bond, fumaric acid, maleic acid, maleic acid anhydride, itaconic acid, and citraconic acid can be used as $\alpha,\beta$-unsaturated dicarboxylic acids, and 2,5-norbornene dicarboxylic acid anhydride, tetrahydrophthalic acid anhydride, and the like can be used as alicyclic dicarboxylic acids containing an unsaturated double bond. Among them, fumaric acid, maleic acid, and 2,5-norbornene dicarboxylic acid (end-bicyclo-(2,2,1)-5-heptene-2,3-dicarboxylic acid) are preferable.

The above-described diol component is formed of at least one of an aliphatic glycol having 2 to 10 carbon atoms, an alicyclic glycol having 6 to 12 carbon atoms, and a glycol containing an ether bond.

As the aliphatic glycol having 2 to 10 carbon atoms, ethylene glycol, 1,2-propylene glycol, 1,3-propanediol, 1,4-butanediol, 1,5-pentanediol, neopentyl glycol, 1,6-hexanediol, 3-methyl-1,5-pentanediol, 1,9-nonanediol, 2-ethyl-2-butylpropanediol, and the like can be used.

As the alicyclic glycol having 6 to 12 carbon atoms, 1,4-cyclohexanedimethanol and the like can be used.

As the glycol containing an ether bond, diethylene glycol, triethylene glycol, dipropylene glycol, and further, glycols obtained by adding 1 to several moles of ethylene oxide or propylene oxide to each of the two phenolic hydroxy groups of a bisphenol, e.g., 2,2-bis(4-hydroxyethoxy phenyl)propane and the like, can be used. Polyethylene glycol, polypropylene glycol, and polytetramethylene glycol can also be used as necessary.

Besides the above-described dicarboxylic acid component and the above-described diol component, a trifunctional or higher-functional polycarboxylic acid and/or polyol can be copolymerized.

As the trifunctional or higher-functional polycarboxylic acid, trimellitic acid (anhydride), pyromellitic acid (anhydride), benzophenone tetracarboxylic acid (anhydride), trimesic acid, ethylene glycol bis(anhydrotrimellitate), glycerol tris(anhydrotrimellitate), and the like can be used.

As the trifunctional or higher-functional polyol, glycerin, trimethylolethane, trimethylolpropane, pentaerythritol, and the like can be used.

The trifunctional or higher-functional polycarboxylic acid and/or polyol can be used within a range of 0 to 5 mol % and preferably 0 to 3 mol % with respect to all polycarboxylic acid components including the above-described dicarboxylic acid component or all polyol components including the above-described diol component.

(Graft Moiety of Acrylic Graft Copolymerized Polyester)

The graft moiety of the grafted polyester that can be used in the present invention can be a polymer derived from a monomer mixture containing at least one type of radically polymerizable monomer having a hydrophilic group or a group that can be changed to a hydrophilic group later.

The weight-average molecular weight of the polymer forming the graft moiety is 500 to 50000 and preferably 4000 to 50000. If the weight-average molecular weight is lower than 500, a grafting rate decreases, and thus hydrophilicity imparted to the polyester is not sufficiently. In addition, in general, it is difficult to control the weight-average molecular weight of a graft moiety to be lower than 500. The graft moiety forms a hydration layer of dispersed particles. It is desirable that the weight-average molecular weight of the graft moiety derived from the radically polymerizable monomer is not lower than 500 in order to form a hydration layer having a sufficient thickness on particles and obtain a stable dispersion. The upper limit of the weight-average molecular weight of the graft moiety of the radically polymerizable monomer is preferably 50000 as described above in terms of polymerizability in solution polymerization. Control of the molecular weight to be within this range can be performed by appropriately selecting a polymerization initiator amount, a monomer dropping time, a polymerization time, a reaction solvent, and a monomer composition and appropriately combining, as necessary, a chain transfer agent or a polymerization inhibitor. The glass transition point of the polymer forming the graft moiety is not higher than 30° C. and preferably not higher than 10° C.

As the hydrophilic group of the radically polymerizable monomer, a carboxyl group, a hydroxy group, a sulfonic acid group, an amide group, a quaternary ammonium salt, a phosphoric acid group, and the like can be used. As the group that can be changed to the hydrophilic group, acid anhydride, glycidyl, chlor, and the like can be used. The dispersibility of the grafted polyester in water can be controlled with the hydrophilic group that is introduced into the polyester by grafting. Among the above-described hydrophilic groups, a carboxyl group allows the introduction amount thereof into the grafted polyester to be accurately determined by using an acid value publicly known in this technical field, and thus is preferable for controlling the dispersibility of the grafted polyester in water.

As the carboxyl-group-containing radically polymerizable monomer, acrylic acid, methacrylic acid, maleic acid, fumaric acid, itaconic acid, citraconic acid, and the like can be used, and furthermore, maleic acid anhydride, itaconic acid anhydride, methacrylic acid anhydride, and the like that easily generate a carboxylic acid by being brought into contact with water/amine, can be used. Preferable carboxyl-group-containing radically polymerizable monomers are acrylic acid anhydride, methacrylic acid anhydride, and maleic acid anhydride.

Besides the above-described hydrophilic-group-containing radically polymerizable monomer, at least one type of radically polymerizable monomer containing no hydrophilic group is preferably copolymerized. With only the hydrophilic-group-containing monomer, grafting to the polyester main chain does not smoothly occur, and it is difficult to obtain a favorable copolymerized polyester water-based dispersion. Highly efficient grafting cannot be performed without copolymerizing at least one type of radically polymerizable monomer containing no hydrophilic group.

As the radically polymerizable monomer containing no hydrophilic group, among monomers that have ethylenic unsaturated bonds and that do not contain the above-described hydrophilic groups, one type is used or a combination of two or more types is used. Examples of this monomer can include: acrylic acid esters such as methyl acrylate, ethyl acrylate, isopropyl acrylate, n-butyl acrylate, 2-ethylhexyl acrylate, 2-hydroxyethyl acrylate, and hydroxypropyl acrylate; methacrylic acid esters such as methyl methacrylate, ethyl methacrylate, isopropyl methacrylate, n-butyl methacrylate, isobutyl methacrylate, n-hexyl methacrylate, lauryl methacrylate, 2-hydroxyethyl methacrylate, and hydroxylpropyl methacrylate; acrylic acid derivatives and methacrylic acid derivatives such as acrylamide, N-methylolacrylamide, and diacetone acrylamide; nitriles such as acrylonitrile and methacrylonitrile; vinyl esters such as vinyl acetate, vinyl propionate, and vinyl benzoate; vinyl ethers such as vinyl methyl ether, vinyl ethyl ether, and vinyl isobutyl ether; vinyl ketones such as vinyl methyl ketone, vinyl hexyl ketone, and methyl isopropenyl ketone; N-vinyl compounds such as N-vinylpyrrole, N-vinylcarbazole, N-vinylindole, and N-vinylpyrrolidone; vinyl halides such as vinyl chloride, vinylidene chloride, vinyl bromide, and vinyl fluoride; and aromatic vinyl compounds such as styrene, α-methylstyrene, t-butylstyrene, vinyl toluene, and vinylnaphthalenes. These monomers can be used singly or two or more of the monomers can be used in combination.

The use ratio between the hydrophilic-group-containing monomer and the monomer containing no hydrophilic group is determined in consideration of the amount of the hydrophilic group to be introduced into the grafted polyester, and is ordinarily within a range of 95:5 to 5:95, preferably 90:10 to 10:90, and further preferably 80:20 to 40:60 in terms of mass ratio (hydrophilic-group-containing monomer:monomer containing no hydrophilic group).

In the case of using a carboxyl-group-containing monomer as the hydrophilic-group-containing monomer, the total acid value of the grafted polyester is 600 to 4000 eq./$10^6$ g, preferably 700 to 3000 eq./$10^6$ g, and most preferably 800 to 2500 eq./$10^6$ g. If the acid value is not higher than 600 eq./$10^6$ g, a copolymerized polyester water-based dispersion having a small particle diameter is difficult to be obtained at the time of dispersion of the grafted polyester in water, and further, the dispersion stability of the copolymerized polyester water-based dispersion decreases. Meanwhile, if the acid value is not lower than 4000 eq./$10^6$ g, the water resistance of the easily adhesive layer formed from the copolymerized polyester water-based dispersion is low.

The mass ratio of the polyester main chain to the graft moiety in the acrylic graft copolymerized polyester (polyester:radically polymerizable monomer) is within a range of 40:60 to 95:5, preferably 55:45 to 93:7, and further preferably 60:40 to 90:10.

If the mass ratio of the polyester main chain is not higher than 40% by mass, excellent performances, i.e., high processability, excellent water resistance, and excellent adhesion to various kinds of base materials, of the already-described base polyester cannot be sufficiently exhibited. On the contrary, undesirable performances, i.e. low processability, glossiness, water resistance, and the like, of the acrylic resin are imparted. Meanwhile, if the mass ratio of the polyester is not lower than 95% by mass, the amount of the hydrophilic group of the graft moiety for imparting hydrophilicity to the grafted polyester is insufficient, and a favorable aqueous dispersion cannot be obtained.

[Solvent for Grafting Reaction for Acrylic Graft Copolymerized Polyester]

A solvent for a grafting reaction is preferably formed of an aqueous organic solvent having a boiling point of 50 to 250° C. Here, the aqueous organic solvent refers to an organic solvent having a solubility in water at 20° C., that is at least not lower than 10 g/L and preferably not lower than 20 g/L. An aqueous organic solvent having a boiling point higher than 250° C. has a low evaporation rate, and thus, after formation of a coating film, cannot be sufficiently removed even by high-temperature seizure of the coating film. Therefore, such an aqueous organic solvent is inappropriate. Meanwhile, if a grafting reaction is performed by using an aqueous organic solvent having a boiling point not higher than 50° C. as a solvent, an initiator that decomposes into radicals at a temperature not higher than 50° C. has to be used. Therefore, such an aqueous organic solvent poses an increased risk in handling and thus is not preferable.

Examples of the aqueous organic solvent (first group) that favorably dissolves a polyester and relatively favorably dissolves polymerizable monomers including a polymerizable monomer containing a hydrophilic group, particularly a carboxyl group, and a polymer of the polymerizable monomers, can include: esters, e.g., ethyl acetate; ketones, e.g., methyl ethyl ketone, methyl isobutyl ketone, and cyclohexanone; cyclic ethers, e.g., tetrahydrofuran, dioxane, and 1,3-dioxolane; glycol ethers, e.g., ethylene glycol dimethyl ether, propylene glycol methyl ether, propylene glycol propyl ether, ethylene glycol ethyl ether, and ethylene glycol butyl ether; carbitols, e.g., methyl carbitol, ethyl carbitol, and butyl carbitol; lower esters of glycols or glycol ether, e.g., ethylene glycol diacetate and ethylene glycol ethyl ether acetate; ketone alcohols, e.g., diacetone alcohol; N-substituted amides, e.g., dimethylformamide, dimethylacetamide, and N-methylpyrrolidone; and the like.

Meanwhile, examples of the aqueous organic solvent (second group) that hardly dissolves a polyester but relatively favorably dissolves polymerizable monomers including a polymerizable monomer containing a hydrophilic group, particularly a carboxyl group, and a polymer of the polymerizable monomers, can include water, lower alcohols, lower glycols, lower carboxylic acids, lower amines, and the like. Alcohols and glycols having 1 to 4 carbon atoms are preferable.

In the case of performing a grafting reaction in a single solvent, one type of aqueous organic solvent in the first group can be used. In the case of performing a grafting reaction in a mixed solvent, a plurality of types of aqueous organic solvents in the first group can be used, or at least one type of aqueous organic solvent in the first group and at least one type of aqueous organic solvent in the second group can be used.

A grafting reaction can be performed in either of a single solvent from the aqueous organic solvents in the first group and a mixed solvent formed of one type of aqueous organic solvent in the first group and one type of aqueous organic solvent in the second group. However, use of a mixed solvent formed of one type of aqueous organic solvent in the first group and one type of aqueous organic solvent in the second group is preferable from the viewpoints of: the manner of progress of a grafting reaction; the appearance and the property of a grafting reaction product and a water-based dispersion derived therefrom; and the like. The reason for this is because, although system gelation easily occurs in a grafting reaction of a polyester owing to crosslinks between the molecules of the polyester, the gelation can be prevented by using a mixed solvent as described below.

The facts that polyester molecular chains are each in a state of a stretched chain with a large expanse in a solvent from the first group, and meanwhile, polyester molecular chains are each in a state of being entwined in a thread ball shape with a small expanse in a mixed solvent from the first group and second group, were confirmed by measuring the viscosities of the polyesters in these solutions. In the state where the polyester molecular chains are stretched, all reactive points in the polyester main chain can contribute to the grafting reaction, and thus the grafting rate of the polyester is high, but, at the same time, the rate of occurrence of crosslinks between the molecules also becomes high. Meanwhile, in the case where the polyester molecular chains are in thread ball shapes, reactive points in the thread balls cannot contribute to the grafting reaction, and, at the same time, the rate of occurrence of crosslinks between the molecules also becomes low. Thus, the states of the polyester molecules can be adjusted by selecting a solvent type so that the grafting rate and crosslinks between the molecules by the grafting reaction can be adjusted.

Achievement of both a high grafting rate and suppression of gelation can be made in a mixed solvent system. Although the optimal mixing ratio in the mixed solvent from the first group and the second group is variable according to the solubility of the polyester to be used or the like, the mass ratio in the mixed solvent of the first group and the second group is ordinarily within a range of 95:5 to 10:90, preferably 90:10 to 20:80, and further preferably 85:15 to 30:70.

[Radical Polymerization Initiator and Another Additive of Acrylic Graft Copolymerized Polyester]

As a radical polymerization initiator that can be used in the present invention, an organic peroxide and an organic azo compound known to a person skilled in the art can be used.

Examples of the organic peroxide can include benzoyl peroxide and t-butyl peroxypivalate. Examples of the organic azo compound can include 2,2'-azobisisobutyronitrile, 2,2'-azobis(2,4-dimethylvaleronitrile), and the like.

The amount of the radical polymerization initiator to be used for performing the grafting reaction is at least not lower than 0.2% by mass and preferably not lower than 0.5% by mass with respect to the radically polymerizable monomer.

Besides the polymerization initiator, a chain transfer agent for adjusting the chain length of the graft moiety, e.g., octyl mercaptan, mercaptoethanol, 3-t-butyl-4-hydroxyanisole, or the like, can be used as necessary. In this case, the chain transfer agent is desirably added within a range of 0 to 5% by mass with respect to the radically polymerizable monomer.

[Grafting Reaction for Acrylic Graft Copolymerized Polyester]

Formation of the graft moiety progresses by: polymerization of the above-described radically polymerizable monomer and the radically polymerizable unsaturated double bond in the above-described polyester; and/or reaction of the radically polymerizable unsaturated double bond and an active end of the polymer of the above-described radically polymerizable monomer. The reaction product after the end of the grafting reaction contains, in addition to the intended grafted polyester, a polyester that does not have any graft moiety and a polymer of a radically polymerizable monomer that has not been grafted to any polyester. If the proportion of the generated grafted polyester in the reaction product is low and the proportions of the polyester that does not have any graft moiety and the polymer of the radically polymerizable monomer that has not been grafted are high, a dispersion having a favorable stability is not obtained.

Ordinarily, a grafting reaction can be performed by: adding, at one time, the above-described radically polymerizable monomer and a radical initiator into a solution containing the above-described polyester during temperature increase; or separately dropping, over a certain time, the radically polymerizable monomer and the radical initiator into the solution containing the polyester during temperature increase, and then further continuing, for a certain time, the temperature increase during stirring, to cause the reaction to progress. Alternatively, as necessary, the grafting reaction can be performed by adding a portion of the radically polymerizable monomer first, then separately dropping the rest of the radically polymerizable monomer and the polymerization initiator over a certain time, and then further continuing, for a certain time, the temperature increase during stirring.

Regarding the mass ratio between the polyester and the solvent, a mass ratio that allows the reaction to evenly progress during a polymerization step is selected in consideration of the reactivity between the polyester and the radically polymerizable monomer and the solubility of the polyester in the solvent. The mass ratio is ordinarily within a range of 70:30 to 10:90 and preferably within a range of 50:50 to 15:85.

[Dispersion of Acrylic Graft Copolymerized Polyester in Water]

The grafted polyester that can be used in the present invention can be dispersed in water by: putting the grafted polyester in a solid state into a water-based medium; or dissolving the grafted polyester in a hydrophilic solvent and then putting the solution into the water-based medium. In particular, in the case where a monomer having acid groups such as a sulfonic acid group and a carboxyl group has been used as the radically polymerizable monomer having the hydrophilic group, the grafted polyester is neutralized with a basic compound so that the grafted polyester is easily dispersed in water as fine particles having an average particle diameter not larger than 500 nm, whereby a copolymerized polyester water-based dispersion can be prepared.

A desirable basic compound is a compound that volatilizes at the time of formation of a coating film or, in the case of blending a curing agent described below, at the time of seizure and curing. As such a basic compound, ammonia, organic amines, and the like are preferable. Examples of the organic amines can include triethylamine, N,N-diethylethanolamine, N, N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, triethanolamine, and the like.

The use amount of the basic compound is preferably an amount that causes the pH value of the water-based dispersion to fall within a range of 5.0 to 9.0 by performing at least partial neutralization or complete neutralization for the carboxyl group contained in the graft moiety.

Regarding a method for preparing a copolymerized polyester water-based dispersion neutralized with the basic compound, the water-based dispersion can be prepared by: removing, after the end of the grafting reaction, the solvent from the reaction liquid with an extruder or the like under reduced pressure, causing the remaining solute to be in a melted state or a solid state (a pellet, a powder, or the like), then putting the solute into an aqueous solution of the basic compound, and stirring the solution while heating it; or, upon the end of the grafting reaction, immediately putting the aqueous solution of the basic compound into the reaction liquid and further continuing to heat and stir the reaction liquid (one-pot method). From the viewpoint of convenience, the one-pot method is preferable. In this case, if the boiling point of the solvent used in the grafting reaction is not higher than 100° C., a portion or the entirety of the solvent can be easily removed by distillation.

[Crosslinking Agent to be Added to Coating Liquid for Forming Easily Adhesive Layer]

The above-described coating liquid can be used as a coating agent for forming the easily adhesive layer as is. However, if a crosslinking agent (curing resin) is further blended and curing is caused, a high level of water resistance can be imparted to the easily adhesive layer.

As the crosslinking agent, the following crosslinking agent can be used: a phenol formaldehyde resin of a condensate of formaldehyde and an alkylated phenol, a cresol, or the like; an amino resin such as an adduct of formaldehyde and urea, melamine, benzoguanamine, or the like, or an alkyl ether compound formed of the adduct and an alcohol having 1 to 6 carbon atoms; a polyfunctional epoxy compound; a polyfunctional isocyanate compound; a blocked isocyanate compound; a polyfunctional aziridine compound; an oxazoline compound; or the like.

Examples of the phenol formaldehyde resin can include condensates of formaldehyde and a phenol such as an alkylated (methyl, ethyl, propyl, isopropyl, or butyl) phenol, p-tert-amylphenol, 4,4'-sec-butylidenephenol, p-tert-butylphenol, o-, m-, p-cresol, p-cyclohexylphenol, 4,4'-isopropylidenephenol, p-nonylphenol, p-octylphenol, 3-pentadecylphenol, phenol, phenyl-o-cresol, p-phenylphenol, or xylenol.

Examples of the amino resin include methoxylated methylolurea, methoxylated methylol-N,N-ethylene urea, methoxylated methylol dicyandiamide, methoxylated methylol melamine, methoxylated methylol benzoguanamine, butoxylated methylol melamine, butoxylated methylol benzoguanamine, and the like. Preferable examples of the amino resin can include methoxylated methylol melamine, butoxylated methylol melamine, methylolated benzoguanamine, and the like.

Examples of the polyfunctional epoxy compound can include diglycidyl ether of bisphenol A and oligomers thereof, diglycidyl ether of hydrogenated bisphenol A and oligomers thereof, orthophthalic acid diglycidyl ester, isophthalic acid diglycidyl ester, terephthalic acid diglycidyl ester, p-oxybenzoic acid diglycidyl ester, tetrahydro phthalic acid diglycidyl ester, hexahydro phthalic acid diglycidyl ester, succinic acid diglycidyl ester, adipic acid diglycidyl ester, sebacic acid diglycidyl ester, ethylene glycol diglycidyl ether, propylene glycol diglycidyl ether, 1,4-butanediol diglycidyl ether, 1,6-hexanediol diglycidyl ether, and polyalkylene glycol diglycidyl ethers, trimellitic acid triglycidyl ester, triglycidyl isocyanurate, 1,4-diglycidyloxybenzene, diglycidyl propylene urea, glycerol triglycidyl ether, trimethylolpropane triglycidyl ether, pentaerythritol triglycidyl ether, triglycidyl ethers of glycerol-alkylene oxide adducts, and the like.

As the polyfunctional isocyanate compound, a low-molecular or high-molecular aromatic/aliphatic diisocyanate, or a tri- or higher-valent polyisocyanate, can be used. Examples of the polyisocyanate include tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate, and trimers of these isocyanate compounds. Examples of the polyisocyanate can further include end-isocyanate-group-containing compounds obtained by reacting excessive amounts of these isocyanate compounds with: low-molecular active hydrogen compounds such as ethylene glycol, propylene glycol, trimethylolpropane, glycerin, sorbitol, ethylenediamine, monoethanolamine, diethanolamine, or triethanolamine; or high-molecular active hydrogen compounds such as polyester polyols, polyether polyols, or polyamides.

The blocked isocyanate can be prepared through an addition reaction of the above-described isocyanate compound and a blocking agent by a conventionally-known appropriate method. Examples of the blocking agent for isocyanate can include: phenols such as phenol, cresol, xylenol, resorcinol, nitrophenol, and chlorophenol; thiophenols such as thiophenol and methylthiophenol; oximes such as acetoxime, methylethylketoxime, and cyclohexanone oxime; alcohols such as methanol, ethanol, propanol, and butanol; halogen-substituted alcohols such as ethylene chlorhydrin and 1,3-dichloro-2-propanol; tertiary alcohols such as t-butanol and t-pentanol; lactams such as ε-caprolactam, δ-valerolactam, v-butyrolactam, and ß-propyllactam; aromatic amines; imides; active methylene compounds such as acetylacetone, acetoacetic ester, and malonic acid ethyl ester; mercaptans; imines; ureas; diaryl compounds; sodium bisulfite; and the like.

These crosslinking agents can be used singly or two or more types of the crosslinking agents can be mixed and used. The blending amount of the crosslinking agent is preferably 5% by mass to 40% by mass with respect to the grafted polyester.

As the method for blending the crosslinking agent, (1) a method in the case where the crosslinking agent is water-soluble, in which the crosslinking agent is directly dissolved or dispersed in the water-based dispersion, or (2) a method in the case where the crosslinking agent is oil-soluble, in which, after the end of the grafting reaction, the crosslinking agent is added before or after dispersion in water and caused to coexist with the polyester in the core moiety, can be employed. These methods can be selected as appropriate according to the type and the property of the crosslinking agent. Furthermore, a curing agent or an accelerator can be used together with the crosslinking agent.

The easily adhesive layer used in the present invention may further contain, within a range that does not cause impairment of the advantageous effects of the present invention, additives such as an antistatic agent, an inorganic lubricant, and an organic lubricant in order to impart antistatic properties and slipperiness. In the case of coating an antistatic agent, an inorganic lubricant, an organic lubricant, and the like on a surface of the film, these additives are preferably contained in the easily adhesive layer, to be prevented from separating.

As the method for coating the coating agent containing the copolymerized polyester water-based dispersion on a polyamide film base material in order to form the easily adhesive layer, publicly-known coating methods such as a gravure coating method, a reverse coating method, a die coating method, a bar coating method, a dip coating method, and the like can be employed.

The coating amount of the coating agent on the polyester film having been biaxially oriented is 0.01 to 3 g/m$^2$ in terms of solid content. The coating agent is preferably coated such that the coating amount thereof is set to 0.04 to 0.5 g/m$^2$. If the coating amount is not higher than 0.01 g/m$^2$, a sufficient adhesion strength between the easily adhesive layer and the other layer is not obtained. Meanwhile, if the coating amount is not lower than 3 g/m$^2$, blocking occurs, and a problem arises in practical use.

The easily adhesive layer can be prepared by: coating the coating agent on a biaxially stretched polyamide film base material or coating the coating agent on a polyamide film base material that has not yet been stretched or has been uniaxially stretched; then drying the coating agent; further performing uniaxial stretch or biaxial stretch, as necessary; and thereafter performing heat setting. Regarding the drying temperature after coating of the coating agent, if the drying and the heat setting are performed at not lower than 150° C. and preferably not lower than 200° C., the coating film is stiffened, and the adhesiveness between the easily adhesive layer and the polyamide film base material is improved.

In the case of performing stretch after the coating, the drying after the coating needs to be such that the moisture content of the coating film is controlled to fall within a range of 0.1 to 2% so as to prevent impairment of the stretchability of the coating film. If the drying and the heat setting are performed at not lower than 200° C. after the stretch, the coating film is stiffened, and the adhesiveness between the easily adhesive layer and the polyamide film base material is significantly improved.

[Physical Properties of Biaxially Stretched Polyamide Film]

The biaxially oriented polyamide film of the present invention has a molecular orientation angle not smaller than 20° and a strain at moisture absorption not higher than 1.3%. The strain at moisture absorption is more preferably not higher than 1.1%. If the strain at moisture absorption is higher than 1.3%, S-shape curling due to moisture absorption of a bag having been made increases, and a problem arises.

The biaxially oriented polyamide film of the present invention is a film close to an end in the transverse direction of a mill roll, and thus has a molecular orientation angle not smaller than 20°. As the molecular orientation angle, the angle of the direction of a molecular chain orientation axis is measured with a molecular orientation angle measurement device MOA-6004 manufactured by Oji Scientific Instruments. The molecular orientation angle is a value that, with the angle of the machine direction of the film being defined as 0 degrees, is obtained as: the difference from 0 degrees if the above-described direction of the molecular orientation axis is smaller than 45 degrees relative to the machine direction; or the difference from 90 degrees if the direction of the molecular orientation axis is larger than 45 degrees relative to the machine direction. The larger the value is, the more intense a bowing phenomenon is. The value is larger at a position closer to an end of the mill roll relative to the center of the mill roll. Therefore, in the present invention, it is important to obtain a film having a low strain at moisture absorption even if the molecular orientation angle is large.

The impact strength of the biaxially oriented polyamide film of the present invention is not lower than 0.8 J/15 μm. The impact strength is preferably not lower than 1.0 J/15 μm. If the impact strength is lower than 0.8 J/15 μm, a packaging bag used for packaging may be torn owing to impact during transportation. A larger impact strength is less likely to result in tearing of the packaging bag, and thus is preferable. However, in terms of manufacturing, it is difficult to set the impact strength to be higher than 2.0 J/15 μm while satisfying other characteristics.

The heat shrinkage rate, after heating for ten minutes at 160° C., of the biaxially oriented polyamide film of the present invention is within a range of 0.6 to 3.0% both in an MD direction (machine direction) and a TD direction (transverse direction). This heat shrinkage rate is preferably 0.6 to 2.5%. A heat shrinkage rate higher than 3.0% causes the film to shrink and have a poor appearance at the time of printing processing, lamination processing, or bag-making processing, and thus is not preferable. Meanwhile, a heat shrinkage rate lower than 0.6 may lead to increase in the strain at moisture absorption.

The biaxially oriented polyamide film of the present invention preferably has an orientation angle not smaller than 20° and a strain at thermal shrinkage not higher than 2.0%. The strain at thermal shrinkage is more preferably not higher than 1.8%. If the strain at thermal shrinkage is higher than 2.0%, when a bag is heat-sealed, a heat-sealed portion may experience shrinkage deformation, resulting in a poor appearance. In addition, a sufficient effect of suppressing S-shape curling may not be obtained.

[Method for Manufacturing Biaxially Oriented Polyamide Film]

The biaxially oriented polyamide film of the present invention is obtained by, for example, performing preparatory longitudinal stretch in a low ratio on an unstretched polyamide film first in the machine direction, then performing main longitudinal stretch in the machine direction in two or more stages such that the total longitudinal stretch ratio is set to be not lower than 3 times, then performing transverse stretch, heat setting treatment, and heat relaxation treatment, then trimming clip-held portions, winding the polyamide film as a mill roll, and then slitting the mill roll into a width for processing.

Although the width of the mill roll of the biaxially oriented polyamide film of the present invention is not particularly limited, the width is ordinarily 3000 to 8000 mm. Although the winding length of the polyamide film mill roll is not particularly limited, the winding length is ordinarily 5000 to 70000 m.

The width of a roll obtained by the slitting for processing is 400 to 3000 mm, and the winding length of the roll is 3000 to 10000 m.

In association with increase in the sizes of films for aluminum vacuum vapor deposition machines and the like, the sizes of slit rolls have also been increased in recent years. Thus, the slit roll may have a width and a winding length larger than the aforementioned width and winding length.

The biaxially oriented polyamide film of the present invention is a film close to the end of the mill roll, and thus has an orientation angle not smaller than 20°.

The biaxially oriented polyamide film of the present invention tends to, at a position thereof closer to the end of the mill roll, have a larger orientation angle and also have a higher strain at moisture absorption and a higher strain at thermal shrinkage.

With a film roll including the biaxially orientated polyamide in which a film at the right end or the left end obtained by slitting the film roll has an orientation angle not smaller than 20° and a strain at moisture absorption not higher than 1.3%, the amount of S-shape curling due to moisture absorption of a bag obtained by processing can be reduced to an amount that does not cause any problem.

A preferable method for obtaining the biaxially oriented polyamide film of the present invention will be described more in detail.

Regarding the biaxially oriented polyamide film of the present invention, it is preferable that, for example, an unstretched polyamide film is subjected to preparatory longitudinal stretch in a low ratio in the machine direction, then subjected to main longitudinal stretch in a high ratio in the machine direction in two or more stages, subsequently subjected to transverse stretch, and further subjected to heat setting treatment and heat relaxation treatment, thereby forming a biaxially oriented polyamide film which is wound to obtain a mill roll.

The above-described preparatory longitudinal stretch may be performed in one stage or in two or more stages. It is noted that the total stretch ratio obtained by multiplying the stretch ratios in the preparatory longitudinal stretches is preferably 1.005 to 1.15 times.

The main longitudinal stretch performed subsequently to the preparatory longitudinal stretch preferably involves stretch in the machine direction in two or more stages. The ratio in the first stage of main longitudinal stretch is preferably 1.1 to 2.9 times. The ratio in the second or subsequent stage of main longitudinal stretch is preferably set such that the total longitudinal stretch ratio obtained by multiplying the stretch ratios including the preparatory longitudinal stretch ratio is set to 2.8 to 5.0 times. The total longitudinal stretch ratio is more preferably 3.0 to 3.5 times.

An example of the method for obtaining the biaxially oriented amide film of the present invention will be described.

First, a raw material containing the above-described polyamide 6 as a main component is dried, then melt-extruded with an extruder, cast on a rotating drum from a T-die, and rapidly cooled and solidified, thereby obtaining an unstretched polyamide film.

The unstretched film is subjected to the preparatory longitudinal stretch of 1.005 to 1.15 times at a temperature not lower than [glass transition temperature (hereinafter, abbreviated as Tg)+20]° C. and not higher than [low-temperature crystallization temperature (hereinafter, abbreviated as Tc)+20]° C.

Here, Tg and Tc are values obtained through measurement by the method described in EXAMPLES.

Performing the preparatory longitudinal stretch at a temperature lower than (Tg+20)° C. makes it more likely that necking occurs and unevenness in the thickness increases. Meanwhile, performing the stretch at a temperature higher than (Tc+20)° C. causes thermal crystallization to progress and makes it more likely that rupture occurs by transverse stretch, and thus is not preferable. A more preferable stretch temperature is (Tg+30)° C. to (Tc+10)° C. If the stretch ratio in the preparatory longitudinal stretch is excessively low, an effect of improving the strain at moisture absorption is less likely to be obtained. In contrast, if the stretch ratio is excessively high, oriented crystallization excessively progresses, and a stretching stress in the main longitudinal stretch described later becomes excessively high, whereby rupture is more likely to occur at the time of performing the main longitudinal stretch or the transverse stretch. From this viewpoint, the stretch ratio in the preparatory stretch is preferably 1.005 to 1.15 times. A more preferable stretch ratio is 1.01 to 1.1 times. Although the preparatory longitudinal stretch may be performed in one stage or in multiple stages, the total preparatory longitudinal stretch ratio is preferably set to fall within the above-described range.

For the preparatory longitudinal stretch, publicly-known longitudinal stretch methods such as thermal roll stretch and infrared radiation stretch can be employed.

It is preferable to, after performing preparatory stretch in the machine direction, subsequently perform main stretch in the machine direction (abbreviated as main longitudinal stretch) in multiple stages. The main longitudinal stretch is preferably performed at a stretch temperature not lower than (Tg+20)° C. and not higher than (Tc+20)° C. The first stage of main longitudinal stretch is preferably performed such that the longitudinal stretch ratio is set to 1.1 to 2.9 times. If the stretch ratio in the first stage of main longitudinal stretch is excessively low, a stretching effect is not obtained. In contrast, if the stretch ratio is excessively high, oriented crystallization excessively progresses, and a stretching stress in the second stage of main longitudinal stretch becomes excessively high, whereby rupture is more likely to occur in the longitudinal stretch or the transverse stretch. The stretch temperature in the first stage of main longitudinal stretch is preferably (Tg+20)° C. to (Tc+20)° C. If the stretch temperature is lower than (Tg+20)° C., the stretching stress becomes excessively high, and rupture is more likely to occur in the transverse stretch. Meanwhile, if the stretch temperature is higher than (Tc+20)° C., unevenness in the thickness increases. The stretch temperature is more preferably (Tg+30)° C. to (Tc+10)° C. The stretch ratio in the first stage of main longitudinal stretch is preferably 1.1 to 2.9 times for the same reason as that described above. A more preferable stretch ratio is 1.5 to 2.5 times. For the first stage of main longitudinal stretch, publicly-known longitudinal stretch methods such as thermal roll stretch and infrared radiation stretch can be employed.

After the first stage of main longitudinal stretch, the second stage of main longitudinal stretch is performed subsequently. The second stage of main longitudinal stretch is preferably performed by a thermal roll stretch method. In the second stage of main longitudinal stretch, it is preferable to use a ceramic roll having a surface roughness Ra not larger than 0.2 μm. Use of a roll having an Ra larger than 0.2 μm leads to performing of the stretch in a state where the film slips on the roll. Thus, the said use causes a scratch to be generated on the surface of the film and is not preferable. In addition, the said use causes the starting points for the stretch on the roll to become uneven in the transverse direction or otherwise causes variation among the starting points for the stretch. Thus, the said use causes unevenness in the thickness and is not preferable. That is, in the second stage of main longitudinal stretch, it is preferable that, regardless of the thickness profile in the transverse direction of the film having been subjected to the first stage of main longitudinal stretch, the film is stretched in a state of being linearly adhered in the transverse direction on the roll and is heated and stretched evenly in the transverse direction. Here, Ra refers to a center line average roughness which is the average height (unit=μm) of the projections and recesses and which is a value defined in JIS B 0601.

Regarding the stretch ratio in the second stage of main longitudinal stretch, the second stage of main longitudinal stretch is performed such that the total longitudinal stretch ratio obtained by multiplying the preparatory longitudinal stretch ratios and the main longitudinal stretch ratios is set to be not lower than 2.8 times. If the total longitudinal stretch ratio is lower than 2.8 times, although variations in the physical properties in the transverse direction of the biaxially orientated film become small, the strength thereof in the machine direction decreases. Meanwhile, if the total longitudinal stretch ratio becomes excessively high, there may also be a case where an effect of decreasing the variations in the physical properties in the transverse direction of the biaxially orientated film is not exhibited. Considering this, the total longitudinal stretch ratio is preferably 3.0 to 3.8 times and more preferably 3.0 to 3.5 times. The stretch temperature in the second stage of longitudinal stretch is also (Tg+20)° C. to (Tc+20)° C. If the stretch temperature is lower than (Tg+20)° C., the stretching stress becomes high, and rupture is more likely to occur in the transverse stretch. Meanwhile, if the stretch temperature is higher than (Tc+20)° C., unevenness in the thickness increases. The stretch temperature is more preferably (Tg+30)° C. to (Tc+10)° C.

The aforementioned coating liquid can be coated on a machine direction uniaxially orientated film which has been thus obtained. For coating, known methods such as roll coating methods (a gravure coating method, a reverse coating method, and the like), a knife coating method, a rod coating method, a nozzle coating method, and an air knife coating method can be employed.

After being coated, the coating liquid is dried with hot air or the like, and then stretched in the transverse direction by using a tenter. The coating liquid may be dried with the tenter.

If the transverse stretch temperature is excessively low, the transverse stretchability may deteriorate (rupture may occur). Meanwhile, if the transverse stretch temperature is excessively high, the unevenness in the thickness tends to increase. From this viewpoint, the transverse stretch temperature is preferably 100 to 200° C. and more preferably 120 to 160° C. From the viewpoint of ensuring the strength in the transverse direction, the stretch ratio is preferably 3.0 to 5.0 times and further preferably 3.5 to 4.5 times. The biaxially oriented polyamide film which has been thus stretched is subjected to heat setting treatment and heat relaxation treatment, has clip-held portions thereof cut off, and then is wound as a mill roll.

As described above, it is preferable that the biaxially oriented polyamide film of the present invention is obtained by, for example, performing the preparatory longitudinal stretch and the main longitudinal stretch separately as the longitudinal stretch, performing the main longitudinal stretch in two or more stages with use of a ceramic roll having a surface roughness Ra not larger than 0.2 μm as a stretch roll for the second stage of main longitudinal stretch, then coating and drying the coating liquid, then performing stretch in the transverse direction, performing heat setting treatment and heat relaxation treatment, cutting off clip-held portions, and performing winding as a mill roll.

The biaxially oriented polyamide film of the present invention can also be further subjected to heat setting treatment, heat relaxation treatment, humidity control treatment, and the like in order to further improve the dimensional stability thereof. In addition, the biaxially oriented polyamide film can also be subjected to corona treatment, coating treatment, flame treatment, and the like in order to further improve the adhesiveness and the wettability thereof.

The above-described heat setting treatment, heat relaxation treatment, humidity control treatment, corona treatment, coating treatment, flame treatment, and the like can be performed also during the manufacturing process for the biaxially oriented polyamide film. Alternatively, these treatments can be performed also when a mill roll or a slit roll is wound.

EXAMPLES

Hereinafter, the present invention will be more specifically described by means of examples. It is noted that raw materials used, film physical properties, and characteristics evaluation methods are as follows. Measurement was performed in a measuring room in an environment at 23° C. and a relative humidity of 65%, unless otherwise specified.

<Raw Materials of Biaxially Oriented Polyamide Film>
[Polyamide 6]
A polyamide 6 having a relative viscosity RV of 2.9 and a melting point (Tm) of 220° C. was used.
[Polyamide MXD6]
A polyamide MXD6 having a relative viscosity RV of 2.2 and a melting point (Tm) of 238° C. was used.
[Masterbatch of Silica Fine Particles and Ethylene Bis Stearamide]
93.5% by mass of the above-described polyamide 6, 5% by mass of porous silica fine particles (weight-average particle diameter=4 μm, pore volume=1.6 ml/g), and 1.5% by mass of ethylene bis stearamide (Light Amide WE-183 manufactured by KYOEISHA CHEMICAL CO., LTD.) were mixed, and the mixture was melted, kneaded, and extruded with a twin-screw extruder and cut into a pellet form, whereby a masterbatch was obtained.

<Coating Liquids Used for Forming Easily Adhesive Layers>

The following two types of coating liquids of water-based dispersions were used to form easily adhesive layers.

[Coating Liquid (A): Water-Based Dispersion of Acrylic Graft Copolymerized Polyester]

466 parts by mass of dimethyl terephthalate, 466 parts by mass of dimethyl isophthalate, 401 parts by mass of neopentyl glycol, 443 parts by mass of ethylene glycol, and 0.52 parts by mass of tetra-n-butyl titanate were put into an autoclave made of stainless steel and provided with an agitator, a thermometer, and a partial reflux condenser, and were subjected to a transesterification reaction for four hours at 160 to 220° C. Then, 23 parts by mass of fumaric acid was added and the temperature was increased over one hour from 200° C. to 220° C., to cause an esterification reaction. Then, the temperature was increased to 255° C., the reaction system was gradually decompressed and then reacted while being stirred for one hour and 30 minutes under a reduced pressure of 0.2 mmHg, whereby a polyester was obtained. The obtained polyester was transparent pale yellow and had a glass transition temperature of 60° C. and a weight-average molecular weight of 12000. A composition obtained by NMR measurement and the like was as follows.

Dicarboxylic Acid Components
  Terephthalic acid: 48 mol %
  Isophthalic acid: 48 mol %
  Fumaric acid: 4 mol %
Diol Components
  Neopentyl glycol: 50 mol %
  Ethylene glycol: 50 mol %

75 parts by mass of the above-described polyester resin, 56 parts by mass of methyl ethyl ketone, and 19 parts by mass of isopropyl alcohol were put into a reactor provided with an agitator, a thermometer, a reflux device, and a measure-out dropping device, and were heated and stirred at 65° C., so that the resin was dissolved. After the resin was completely dissolved, a solution obtained by dissolving, in 25 parts by mass of methyl ethyl ketone, 1.2 parts by mass of azobisdimethylvaleronitrile and a mixture of 17.5 parts by mass of methacrylic acid and 7.5 parts by mass of ethyl acrylate was dropped into the polyester solution at 0.2 ml/minute. After the end of the dropping, the resultant solution was further kept stirred for two hours. After a sample (5 g) for analysis was taken from the reaction solution, 300 parts by mass of water and 25 parts by mass of triethylamine were added into the reaction solution, and the reaction solution was stirred for one hour, whereby a grafted polyester dispersion was prepared. Thereafter, the temperature of the obtained dispersion was increased to 100° C. so that methyl ethyl ketone, isopropyl alcohol, and an excess of triethylamine were removed by distillation, whereby a copolymerized polyester water-based dispersion was obtained.

The obtained dispersion was white, had an average particle diameter of 300 nm, and had, at 25° C., a B-type viscosity of 50 centipoises. 1.25 g of heavy water was added to 5 g of the dispersion such that the solid content concentration was set to 20% by mass. Thereafter, DSS was added, and a 13C-NMR at 125 MHz was measured. The width at half maximum of a signal (160 to 175 ppm) of a carbonyl carbon in the polyester main chain was ∞ (no signal was detected), and the width at half maximum of a signal (181 to 186 ppm) of a carbonyl carbon of methacrylic acid in the graft moiety was 110 Hz. The solution taken as the sample at the end of the grafting reaction was dried under vacuum for eight hours at 100° C. Then, regarding the solid component of the solution, the acid value was measured, the efficiency of the grafting of the polyester was measured (NMR measurement), and the molecular weight of the graft moiety was measured by means of hydrolysis. The acid value of the solid component was 2300 eq./$10^6$ g. In the 1H-NMR measurement, no signal (δ=6.8 to 6.9 ppm, doublet) derived from fumaric acid was detected at all, and this led to the confirmation that the efficiency of the grafting of the polyester was 100%. The molecular weight of the graft moiety was 10000 in terms of weight-average molecular weight.

Thereafter, the water-based dispersion which had been obtained as described above was diluted with water such that the solid content concentration was set to 5% by mass, whereby coating liquid (A) was obtained.

[Coating Liquid (B): Water-Based Dispersion of Polyurethane Resin]

(A) a polyurethane and a water-based dispersion liquid were prepared as follows. A polyester (polyester polyol) having a Tg of −5° C. was obtained by using adipic acid as a dicarboxylic acid component and using, as glycol components, 60 mol % (in the glycol components) of 1,4-butanediol and 40 mol % (in the glycol components) of a propylene oxide (1 mol) adduct of bisphenol A. Toluene diisocyanate was caused to act on the polyester, whereby a urethane polymer was obtained. With the urethane polymer as a prepolymer, 1,6-hexanediol was caused to act thereon, to cause chain extension and react aminocarboxylate with ends. Consequently, a water-insoluble and water-dispersible polyurethane was obtained. The polyurethane was dispersed in hot water while the hot water was being stirred, whereby a 25% water-based dispersion liquid was obtained.

The above-described water-based dispersion liquid of the polyurethane was added into and diluted with a mixture liquid containing equal amounts of ion-exchanged water and isopropyl alcohol, such that the solid content was set to 5% by mass. Consequently, coating liquid (B) was obtained.

<Measurement Methods and Evaluation Methods>

Biaxially oriented polyamide films and film rolls were measured and evaluated by the following methods. The results of the measurement and the evaluation are indicated in Table 1 to Table 6 along with film forming conditions.

[Relative Viscosity]

Polyamide solutions obtained by dissolving 0.25 g of the above-described raw material polyamides in 25-ml measuring flasks with use of 96% sulfuric acid such that the polyamides had a concentration of 1.0 g/dl, were each measured for the relative viscosity thereof at 20° C.

[Tg, Tc, and Tm]

A melting peak temperature Tm was measured as a melting point according to JIS K7121 by using DSC-60 type differential scanning calorimeter manufactured by Shimadzu Corporation, in a process of increasing, in a nitrogen atmosphere, the temperature of a pirn containing 10 mg of an unstretched polyamide film from 30° C. to 280° C. at a temperature increase rate of 10° C./minute. When the temperature reached 280° C., the pirn containing the sample was immersed in liquid nitrogen, to be rapidly cooled. Thereafter, the temperature of the pirn was increased from −10° C. to 280° C. at a temperature increase rate of 20° C./minute, and a glass transition initiation temperature Tg and a cool crystallization peak temperature Tc extrapolated in the temperature increase process were measured.

[Coating Amount of Easily Adhesive Layer]

Biaxially oriented polyamide films were each cut so as to have an area of 10 cm×10 cm, the surface of the easily adhesive layer of the film was wiped by using a cloth permeated with a mixed organic solvent with a ratio of methyl ethyl ketone/toluene=1/1, and the weights of the film before and after the wiping were measured by using a precision balance (AUW120D manufactured by Shimadzu Corporation). The difference between the measured weights was converted into a value per square meter, whereby a coating amount (g/m$^2$) was calculated.

[Molecular Orientation Angle]

Each mill roll was slit so that, with a 150-mm portion from the left-side end of the mill roll being an ear, a slit roll having a width of 940 mm was made on the inner side of the ear. Square-shaped film samples in each of which one side is 100 mm were taken, with the centers of the squares being the positions that were inward by 150 mm from the right end and the left end in the transverse direction of the slit roll. The molecular orientation angle (the angle of the direction of a molecular orientation axis) of each film sample was measured with a molecular orientation angle measurement device (MOA-6004) manufactured by Oji Scientific Instruments. The above-described molecular orientation angle was, with the angle of the machine direction of each film being defined as 0 degrees, obtained as: the difference from 0 degrees if the above-described direction of the molecular orientation axis was smaller than 45 degrees relative to the machine direction; or the difference from 90 degrees if the direction of the molecular orientation axis was larger than 45 degrees relative to the machine direction. The larger value is indicated as a molecular orientation angle in Table 1. In each of the examples and the comparative examples, a value at the left end close to the end of the mill roll was larger.

[Film Thickness] and [Impact Strength]

Each mill roll was slit so that, with a 15-mm portion from the left-side end of the mill roll being an ear, a slit roll having a width of 940 mm was made on the inner side of the ear. Measurement samples were cut out, with the centers thereof being the positions that were inward by 150 mm from the right end and the left end in the transverse direction of the slit roll. The thickness of each measurement sample was measured with a thickness measurement device manufactured by TESTER SANGYO CO., LTD. Thereafter, the impact strength of each film was measured with a hemispheric impact head having a diameter of ½ inches by using a film impact tester manufactured by Toyo Seiki Seisakusho, Ltd. The obtained values were each converted to an impact strength per 15 μm with the following expression. Table 1 indicates a value at the left end side at which the molecular orientation angle was larger.

Impact strength (J/15 μm)=observed impact strength (J)×15 μm/thickness (μm)

In evaluation of the mill roll, film samples were taken, with the centers of the film samples being the positions that were inward by 300 mm from the right end and the left end in the transverse direction of the mill roll, and the thickness and the impact strength of each film sample were measured in the same manner. The evaluation results are indicated in Table 2.

[Strain at Moisture Absorption]

Each mill roll was slit so that, with a 150-mm portion from the left-side end of the mill roll being an ear, a slit roll having a width of 940 mm was made on the inner side of the ear. Square-shaped measurement samples in each of which one side is 210 mm were taken, with the centers of the squares being the positions that were inward by 150 mm from the right end and the left end in the transverse direction of the slit roll. A circle having a diameter of 200 mm was drawn around the center of each sample. With the MD direction being defined as 0°, straight lines passing through the center of the circle were drawn in the direction at 45° and the direction at 135°. Then, each sample was left in an atmosphere of 30° C. and 80% RH for at least two hours, and then the diameters in the respective directions were measured to obtain lengths at high humidity. Thereafter, each sample was left in a room at 20° C. and 40% RH for at least two hours. Then, the lengths of the straight lines drawn in the respective diameter directions were measured again to obtain lengths at low humidity, and elongations at moisture absorption were calculated with the following expression. Thereafter, the absolute value (%) of the difference between the elongations at moisture absorption in the direction at 45° and the direction at 135° was calculated as a strain at moisture absorption, and the larger absolute value is indicated as a strain at moisture absorption in Table 1. In each of the examples and the comparative examples, the value at the left end was larger in the same manner as the molecular orientation angle.

Elongation at moisture absorption=[(length at high humidity−length at low humidity)/length at low humidity]×100(%)

In evaluation of the mill roll, film samples were taken, with the centers of the film samples being the positions that were inward by 300 mm from the right end and the left end in the transverse direction of the mill roll, and the strain at moisture absorption of each film sample was measured in the same manner. The evaluation results are indicated in Table 2.

[Heat Shrinkage Rate]

Each mill roll was slit so that, with a 150-mm portion from the left-side end of the mill roll being an ear, a slit roll having a width of 940 mm was made on the inner side of the ear. Measurement samples were cut out, with the centers thereof being the positions that were inward by 150 mm from the right end and the left end in the transverse direction of the slit roll, and the heat shrinkage rates of the measurement samples were measured with the following expression according to the dimensional change testing method described in JIS C2318, except that the test temperature was set to 160° C. and the heating time was set to ten minutes. Table 1 indicates a value on the left end side at which the molecular orientation angle was larger.

Heat shrinkage rate=[(length before treatment−length after treatment)/length before treatment]×100(%)

In evaluation of the mill roll, film samples were taken, with the centers of the film samples being the positions that were inward by 300 mm from the right end and the left end in the transverse direction of the mill roll, and the heat shrinkage rate of each film sample was measured in the same manner. The evaluation results are indicated in Table 2.

[Strain at Thermal Shrinkage]

Each mill roll was slit so that, with a 150-mm portion from the left-side end of the mill roll being an ear, a slit roll having a width of 940 mm was made on the inner side of the ear. Square-shaped measurement samples in each of which one side is 210 mm were taken, with the centers of the squares being the positions that were inward by 150 mm from the right end and the left end in the transverse direction of the slit roll. Each film was left in an atmosphere of 23° C. and 65% RH for at least two hours. Then, a circle having a diameter of 200 mm was drawn around the center of each sample. With the MD direction (machine direction) being defined as 0°, straight lines passing through the center of the circle were drawn in the direction at 45° and the direction at 135°. The diameters in the respective directions were measured to obtain lengths before treatment. Then, each sample was heated at a test temperature of 160° C. for ten minutes, then taken out, and left in an atmosphere of 23° C. and 65% RH for at least two hours. Then, the lengths of the straight lines drawn in the respective diameter directions were measured again to obtain lengths after treatment, and heat shrinkage rates were calculated with the following expression. Thereafter, the absolute value (%) of the difference between the heat shrinkage rates in the direction at 45° and the direction at 135° was calculated as a strain at thermal shrinkage, and the larger absolute value is indicated as a strain at thermal shrinkage in Table 1. In each of the examples and the comparative examples, the value at the left end was larger in the same manner as the molecular orientation angle.

Heat shrinkage rate=[(length before treatment−length after treatment)/length before treatment]× 100(%)

In evaluation of the mill roll, film samples were taken, with the centers of the film samples being the positions that were inward by 300 mm from the right end and the left end in the transverse direction of the mill roll, and the strain at thermal shrinkage of each film sample was measured in the same manner. The evaluation results are indicated in Table 2.

[S-Shape Curling]

Each mill roll was slit so that, with a 150-mm portion from the left-side end of the mill roll being an ear, a slit roll having a width of 940 mm was made on the inner side of the ear. A polyester-based adhesive [an adhesive (solid content concentration: 23%) obtained by mixing TM-569 (product name) and CAT-10L (product name) manufactured by Toyo-Morton, Ltd., in a weight ratio of 7.2/1] was coated on a corona-treated surface of the polyamide film of the slit roll such that a resin solid content after drying was set to 3.2 g/m². Then, 40 μm of a linear low-density polyethylene film (L-LDPE film: manufactured by TOYOBO CO., LTD., LIX (registered trademark) L4102) was dry-laminated, and aging was performed in an environment of 40° C. for two days, whereby a layered film was obtained.

By using a three-side sealed bag making machine manufactured by NISHIBE KIKAI CO., LTD., the layered film wound as a layered film roll as described above was folded in half at the center thereof parallelly to the winding length direction and then cut, and the halves were superimposed on each other such that the polyamide film faces outward. Then, the layered film was thermally sealed in the machine direction at 155° C., by a width of 10 mm at both ends thereof and by a width of 20 mm at a center portion thereof. Further, the layered film was intermittently thermally sealed in a direction perpendicular to the machine direction at 180° C. at intervals of 170 mm, by a width of 20 mm. This layered film was cut, in the winding length direction, at the center of the center sealed portion thereof and at both edge portions thereof such that the width of each bag was set to 220 mm. Then, the layered film was cut, in the direction perpendicular to the winding length direction, at the center of each sealed portion, whereby three-side sealed bags (seal width: 10 mm) were made. Ten left-end-side bags out of these three-side sealed bags having been made were prepared as samples. Subsequently, the ten three-side sealed bags were treated at 30° C. and 60% RH for 24 hours and then retained in an atmosphere of 20° C. and 20% RH for 24 hours. Each of the resultant three-side sealed bags was pressed at three corners thereof, i.e., two corners on the opening portion and one corner on a sealed portion, out of four corners, and the extent of warpage (S-shape curling) at the remaining one corner was evaluated as follows.

Score 10: lower than 40 mm
Score 5: not lower than 40 and lower than 50 mm
Score 1: not lower than 50 mm If the average of scores of the 10-score evaluations was a score not lower than 7, an evaluation of "A" was given. If this average is a score of 3 to 7, an evaluation of "B" was given. If this average is a score lower than 3, an evaluation of "C" was given.

Bags evaluated as "C" which scores lower than 3 suffer drawbacks of errors in boxing of the bags or filling machine conveyance, and thus are problematic. If the score is not lower than 3, the drawbacks are in a permissible range.

[Water Resistant Lamination Strength (Lamination Strength Under Condition of Water Adhesion)]

Each layered film having been made for evaluation of S-shape curling was cut in a strip shape with a width of 15 mm and a length of 200 mm. One end of the layered film was peeled at the interface between the biaxially stretched polyamide film and the linear low-density polyethylene film. A lamination strength was measured by using AUTOGRAPH (manufactured by Shimadzu Corporation) under a condition of a temperature of 23° C., a relative humidity of 50%, a tensile speed of 200 mm/minute, and a peeling angle of 90° while water was being dropped with a dropper to the peeling interface of the above-described layered film having a strip shape. The measurement was performed three times, and evaluation was made on the basis of the average value of the lamination strengths.

Example 1

Raw materials were blended such that 85% by mass of the polyamide 6, 3% by mass of the polyamide MXD6, and 12% by mass of the masterbatch of silica fine particles and ethylene bis stearamide, were contained. The moisture content of the blended raw materials was adjusted to 0.1% by mass, and then the raw materials were extruded with an extruder as melted film at a temperature of 260° C. from a T-die. By application of DC high voltage, the melted film was electrostatically brought into close contact on a metal roll having been cooled to 30° C., so that the melted film was cooled and solidified. Accordingly, an unstretched film having a thickness of 200 μm was obtained. The unstretched film had a Tg of 41° C. and a Tc of 69° C.

By using a roll stretch machine, the unstretched film was subjected to a first stage of preparatory longitudinal stretch of 1.03 times at a stretch temperature of 80° C., then subjected to a second stage of preparatory longitudinal stretch of 1.03 times at a stretch temperature of 80° C., then subjected to a first stage of main longitudinal stretch of 2.1 times at 85° C., and further subjected to a second stage of main longitudinal stretch of 1.5 times at a stretch temperature of 70° C. The longitudinally stretched film was continuously guided to a tenter and subjected to transverse stretch of 4.0 times at 130° C. Then, the resultant film was subjected to heat setting treatment at 210° C. and further subjected to 5.0% relaxation treatment at 210° C. in the transverse direction. The film was successively cooled at 100° C., and corona treatment was performed on one surface thereof. Then, tenter-clip-held portions of both ends of the film were each trimmed by a width of 150 mm, whereby a mill roll of a biaxially oriented polyamide film having a thickness of 15 μm and a width of 6000 mm was obtained.

Example 2

As indicated in Table 1 and Table 2, a biaxially oriented polyamide film was obtained in the same manner as the example, except that the temperatures and the ratios in the preparatory longitudinal stretch and the ratios in the main longitudinal stretch were changed.

Example 3

As indicated in Table 1 and Table 2, a mill roll of a biaxially oriented polyamide film was obtained in the same manner as in Example 2, except that: one stage of preparatory longitudinal stretch was performed in a ratio that was set to the value in Table 1; the ratio in the second stage of main longitudinal stretch was set to the value in Table 1; and the thickness of the unstretched film was changed to 180 μm.

Example 4

A mill roll of a biaxially oriented polyamide film was obtained in the same manner as in Example 3, except that the film manufacturing device was changed to one having a mill roll width of 4000 mm.

Comparative Example 1 to Comparative Example 6

As indicated in Tables 1 and 2, mill rolls of biaxially oriented polyamide films were obtained in the same manner as in the examples, except that: no preparatory longitudinal stretch was performed; and, regarding the main longitudinal stretch, two stages of stretches were performed with the temperatures and the ratios being set to the values indicated in Tables 1 and 2.

Comparative Example 7

As indicated in Tables 1 and 2, a mill roll of a biaxially oriented polyamide film was obtained in the same manner as in the examples, except that: no preparatory longitudinal stretch was performed; and, regarding the main longitudinal stretch, one stage of stretch was performed with the temperature and the ratio being set to the values indicated in Tables 1 and 2.

TABLE 1

| | | | Example 1 | Example 2 | Example 3 | Example 4 | Comparative Example 1 | Comparative Example 2 | Comparative Example 3 |
|---|---|---|---|---|---|---|---|---|---|
| First stage of preparatory longitudinal stretch | Temperature | ° C. | 80 | 85 | 85 | 85 | | | |
| | Ratio | — | 1.03 | 1.02 | 1.07 | 1.07 | | | |
| Second stage of preparatory longitudinal stretch | Temperature | ° C. | 80 | 85 | | | | | |
| | Ratio | — | 1.03 | 1.02 | | | | | |
| First stage of main longitudinal stretch | Temperature | ° C. | 85 | 85 | 85 | 85 | 75 | 85 | 80 |
| | Ratio | — | 2.1 | 2.0 | 2.0 | 2.0 | 1.7 | 2.1 | 1.7 |
| Second stage of main longitudinal stretch | Temperature | ° C. | 75 | 75 | 75 | 75 | 70 | 70 | 70 |
| | Ratio | — | 1.5 | 1.6 | 1.4 | 1.4 | 2.0 | 1.6 | 1.8 |
| Total longitudinal stretch ratio | | — | 3.4 | 3.4 | 3.1 | 3.1 | 3.4 | 3.4 | 3.1 |
| Transverse stretch | Temperature | ° C. | 130 | 130 | 130 | 130 | 130 | 130 | 130 |
| | Ratio | — | 4.0 | 4.0 | 4.0 | 4.0 | 4.0 | 4.0 | 4.0 |
| Heat setting temperature | | ° C. | 210 | 210 | 210 | 210 | 210 | 210 | 195 |
| Relaxation temperature | | — | 210 | 210 | 210 | 210 | 210 | 210 | 195 |
| Relaxation rate | | % | 5.0 | 5.0 | 5.0 | 5.0 | 5.0 | 5.0 | 5.0 |
| Thickness | | μm | 15 | 15 | 15 | 15 | 15 | 15 | 15 |
| Impact strength | | J/15 μm | 1.1 | 1.2 | 1.0 | 1.1 | 1.1 | 1.1 | 1.5 |
| Thermal shrinkage rate 160° C., 10 minutes | MD | % | 1.2 | 1.1 | 1.0 | 1.0 | 1.2 | 1.1 | 3.3 |
| | TD | % | 1.5 | 1.3 | 1.3 | 1.2 | 1.4 | 1.3 | 3.8 |
| Orientation angle | | degree | 25 | 23 | 21 | 23 | 25 | 24 | 20 |
| Strain at moisture absorption | | % | 1.1 | 1.2 | 0.7 | 0.8 | 1.5 | 1.7 | 1.2 |
| Strain at thermal shrinkage | | % | 1.8 | 1.9 | 1.5 | 1.4 | 2.0 | 1.7 | 1.3 |
| S-shape curling | Visual evaluation | | B | B | A | A | C | C | C |

| | | | Comparative Example 4 | Comparative Example 5 | Comparative Example 6 | Comparative Example 7 |
|---|---|---|---|---|---|---|
| First stage of preparatory longitudinal stretch | Temperature | ° C. | | | | |
| | Ratio | — | | | | |
| Second stage of preparatory longitudinal stretch | Temperature | ° C. | | | | |
| | Ratio | — | | | | |
| First stage of main longitudinal stretch | Temperature | ° C. | 80 | 70 | 80 | 70 |
| | Ratio | — | 1.7 | 1.7 | 1.7 | 3.3 |
| Second stage of main longitudinal stretch | Temperature | ° C. | 70 | 70 | 65 | |
| | Ratio | — | 1.8 | 2.0 | 1.5 | |
| Total longitudinal stretch ratio | | — | 3.1 | 3.4 | 2.6 | 3.3 |
| Transverse stretch | Temperature | ° C. | 130 | 130 | 130 | 130 |
| | Ratio | — | 4.0 | 4.0 | 4.0 | 4.0 |
| Heat setting temperature | | ° C. | 215 | 210 | 210 | 210 |
| Relaxation temperature | | — | 215 | 210 | 210 | 210 |
| Relaxation rate | | % | 5.0 | 5.0 | 5.0 | 5.0 |
| Thickness | | μm | 15 | 15 | 15 | 15 |
| Impact strength | | J/15 μm | 0.7 | 1.4 | 0.6 | 1.2 |

TABLE 1-continued

|  |  |  |  |  |  |  |
|---|---|---|---|---|---|---|
| Thermal shrinkage rate | MD | % | 0.4 | 1.4 | 0.5 | 1.5 |
| 160° C., 10 minutes | TD | % | 0.5 | 1.8 | 1.0 | 1.8 |
| Orientation angle |  | degree | 28 | 27 | 22 | 25 |
| Strain at moisture absorption |  | % | 1.9 | 2.1 | 0.7 | 1.9 |
| Strain at thermal shrinkage |  | % | 2.4 | 2.0 | 1.3 | 2.3 |
| S-shape curling |  | Visual evaluation | C | C | B | C |

TABLE 2

|  |  |  | Example 1 | Example 2 | Example 3 | Example 4 | Comparative Example 1 | Comparative Example 2 | Comparative Example 3 |
|---|---|---|---|---|---|---|---|---|---|
| First stage of preparatory longitudinal stretch | Temperature | ° C. | 80 | 85 | 85 | 85 |  |  |  |
|  | Ratio | — | 1.03 | 1.02 | 1.07 | 1.07 |  |  |  |
| Second stage of preparatory longitudinal stretch | Temperature | ° C. | 80 | 85 |  |  |  |  |  |
|  | Ratio | — | 1.03 | 1.02 |  |  |  |  |  |
| First stage of main longitudinal stretch | Temperature | ° C. | 85 | 85 | 85 | 85 | 75 | 85 | 80 |
|  | Ratio | — | 2.1 | 2.0 | 2.0 | 2.0 | 1.7 | 2.1 | 1.7 |
| Second stage of main longitudinal stretch | Temperature | ° C. | 75 | 75 | 75 | 75 | 70 | 70 | 70 |
|  | Ratio | — | 1.5 | 1.6 | 1.4 | 1.4 | 2.0 | 1.6 | 1.8 |
| Total longitudinal stretch ratio |  | — | 3.4 | 3.4 | 3.1 | 3.1 | 3.4 | 3.4 | 3.1 |
| Heat setting temperature |  | ° C. | 210 | 210 | 210 | 210 | 210 | 210 | 195 |
| Relaxation temperature |  | — | 210 | 210 | 210 | 210 | 210 | 210 | 195 |
| Relaxation rate |  | % | 5.0 | 5.0 | 5.0 | 5.0 | 5.0 | 5.0 | 5.0 |
| Thickness | Right side | μm | 15 | 15 | 15 | 15 | 15 | 15 | 15 |
|  | Left side |  | 15 | 15 | 15 | 15 | 15 | 15 | 15 |
| Impact strength | Right side | J/15μ | 1.1 | 1.2 | 1.0 | 1.1 | 1.1 | 1.0 | 1.5 |
|  | Left side |  | 1.2 | 1.3 | 1.1 | 1.1 | 1.2 | 1.1 | 1.4 |
| Strain at moisture absorption | Right side | % | 1.2 | 1.0 | 0.8 | 0.7 | 1.5 | 1.6 | 1.1 |
|  | Left side |  | 1.2 | 1.1 | 0.8 | 0.7 | 1.6 | 1.7 | 1.2 |
| Thermal shrinkage rate at MD direction 160° C., 10 minutes | Right side | % | 1.1 | 1.1 | 1.0 | 1.0 | 1.2 | 1.1 | 3.2 |
|  | Left side |  | 1.2 | 1.0 | 1.0 | 1.1 | 1.2 | 1.0 | 3.4 |
| Thermal shrinkage rate at TD direction 160° C., 10 minutes | Right side | % | 1.5 | 1.3 | 1.3 | 1.2 | 1.4 | 1.3 | 3.8 |
|  | Left side |  | 1.4 | 1.3 | 1.4 | 1.2 | 1.6 | 1.3 | 3.9 |
| Strain at thermal shrinkage | Right side | % | 1.8 | 1.9 | 1.5 | 1.5 | 2.2 | 2.1 | 1.5 |
|  | Left side |  | 1.9 | 1.8 | 1.6 | 1.5 | 2.0 | 1.9 | 1.4 |
| S-shape curling | Visual evaluation |  | B | B | A | A | C | C | C |

|  |  |  | Comparative Example 4 | Comparative Example 5 | Comparative Example 6 | Comparative Example 7 |
|---|---|---|---|---|---|---|
| First stage of preparatory longitudinal stretch | Temperature | ° C. |  |  |  |  |
|  | Ratio | — |  |  |  |  |
| Second stage of preparatory longitudinal stretch | Temperature | ° C. |  |  |  |  |
|  | Ratio | — |  |  |  |  |
| First stage of main longitudinal stretch | Temperature | ° C. |  | 80 | 70 | 80 | 70 |
|  | Ratio | — |  | 1.7 | 1.7 | 3.3 |
| Second stage of main longitudinal stretch | Temperature | ° C. |  | 70 | 70 | 65 |  |
|  | Ratio | — |  | 1.8 | 2.0 | 1.5 |  |
| Total longitudinal stretch ratio |  | — |  | 3.1 | 3.4 | 2.6 | 3.3 |
| Heat setting temperature |  | ° C. | 215 | 210 | 210 | 210 |
| Relaxation temperature |  | — | 215 | 210 | 210 | 210 |
| Relaxation rate |  | % | 5.0 | 5.0 | 5.0 | 5.0 |
| Thickness | Right side | μm | 15 | 15 | 15 | 15 |
|  | Left side |  | 15 | 15 | 15 | 15 |
| Impact strength | Right side | J/15μ | 0.7 | 1.4 | 0.6 | 1.1 |
|  | Left side |  | 0.6 | 1.5 | 0.7 | 1.2 |
| Strain at moisture absorption | Right side | % | 1.7 | 2.0 | 0.6 | 1.8 |
|  | Left side |  | 1.8 | 2.1 | 0.6 | 1.9 |
| Thermal shrinkage rate at MD direction 160° C., 10 minutes | Right side | % | 0.4 | 1.3 | 0.5 | 1.5 |
|  | Left side |  | 0.5 | 1.5 | 0.6 | 1.4 |
| Thermal shrinkage rate at TD direction 160° C., 10 minutes | Right side | % | 0.5 | 1.8 | 1.1 | 1.7 |
|  | Left side |  | 0.5 | 1.9 | 1.0 | 1.8 |
| Strain at thermal shrinkage | Right side | % | 2.4 | 2.2 | 1.3 | 2.3 |
|  | Left side |  | 2.2 | 2.0 | 1.2 | 2.1 |
| S-shape curling | Visual evaluation |  | C | C | B | C |

As indicated in Table 1, even though the biaxially oriented polyamide films of the invention of the present application in Examples 1 to 4 were slit rolls at the ends of the mill rolls, when the biaxially oriented polyamide films were made into bags, occurrence of S-shape curling was within a permissible range.

Meanwhile, the biaxially oriented polyamide films obtained in comparative examples other than Comparative Example 3 and Comparative Example 6 each had a molecular orientation angle larger than 20° and a strain at moisture absorption higher than 1.3%. Thus, when the biaxially oriented polyamide films were made into bags, impermissible amounts of S-shape curling occurred.

The biaxially oriented polyamide film obtained in Comparative Example 3 had a molecular orientation angle larger than 20° and a strain at moisture absorption not higher than 1.3%, but had a high heat shrinkage rate after heating for ten minutes at 160° C. Thus, when the biaxially oriented polyamide film was made into a bag, an impermissible amount of S-shape curling occurred, and a heat-sealed portion of the bag experienced shrinkage deformation.

The biaxially oriented polyamide film obtained in Comparative Example 6 had a strain at moisture absorption not higher than 1.3% and also experienced S-shape curling within a permissible range, but had a low impact strength. Thus, characteristics of a polyamide film required to have impact resistance were not satisfied.

As indicated in Table 2, regarding the polyamide film mill rolls in Examples 1 to 4, even when the slit rolls at the ends thereof were made into bags, occurrence of S-shape curling was within a permissible range.

Meanwhile, each of the polyamide film mill rolls obtained in the comparative examples other than Comparative Example 3 and Comparative Example 6, at each of the positions thereof that were inward by 300 mm from the right end and the left end in the transverse direction of the film, had a strain at moisture absorption higher than 1.3%. Thus, when the polyamide film mill rolls were made into bags, impermissible amounts of S-shape curling occurred.

The polyamide film mill roll obtained in Comparative Example 3, at each of the positions thereof that were inward by 300 mm from the right end and the left end in the transverse direction of the film, had a strain at moisture absorption not higher than 1.3% but had a high heat shrinkage rate after heating for ten minutes at 160° C. Thus, when the polyamide film mill roll was made into a bag, an impermissible amount of S-shape curling occurred, and a heat-sealed portion of the bag experienced shrinkage deformation.

The polyamide film mill roll obtained in Comparative Example 6, at each of the positions thereof that were inward by 300 mm from the right end and the left end in the transverse direction of the film, had a strain at moisture absorption not higher than 1.3% and also experienced S-shape curling within a permissible range, but had a low impact strength. Thus, characteristics of a polyamide film required to have impact resistance were not satisfied.

Example 5

In the same manner as in Example 1, an unstretched film was made, subjected to the first stage of preparatory longitudinal stretch, and then subjected to the second stage of preparatory longitudinal stretch, subjected to the first stage of main longitudinal stretch, and further subjected to the second stage of main longitudinal stretch.

Subsequently, the water-based dispersion coating liquid (A) of the acrylic graft copolymerized polyester was coated on the longitudinally stretched film by a roll coater method and dried with hot air at 70° C.

Subsequently, the longitudinally stretched film was continuously guided to a tenter and subjected to transverse stretch of 4.0 times at 130° C. Then, the resultant film was subjected to heat setting treatment at 210° C. and further subjected to 5.0% relaxation treatment at 210° C. in the transverse direction. The film was successively cooled at 100° C., and corona treatment was performed on one surface thereof. Then, tenter-clip-held portions of both ends of the film were each trimmed by a width of 150 mm, whereby a mill roll of a biaxially oriented polyamide film having a thickness of 15 μm and a width of 6000 mm was obtained. The coating amount of the acrylic graft copolymerized polyester of the obtained biaxially oriented polyamide film was 0.05 g/m² in terms of solid content.

Example 6

As indicated in Table 3 and Table 4, a mill roll of a polyamide film was obtained in the same manner as in Example 5, except that the temperatures and the ratios in the preparatory longitudinal stretch and the ratios in the main longitudinal stretch were changed.

Example 7

As indicated in Table 3 and Table 4, a mill roll of a biaxially oriented polyamide film was obtained in the same manner as in Example 6, except that: one stage of preparatory longitudinal stretch was performed in a ratio that was set to the value in Table 3; the ratio in the second stage of main longitudinal stretch was set to the value in Table 3; and the thickness of the unstretched film was changed to 180 μm.

Example 8

A mill roll of a biaxially oriented polyamide film was obtained in the same manner as in Example 7, except that the film manufacturing device was changed to one having a mill roll width of 4000 mm.

Comparative Example 8 to Comparative Example 14

As indicated in Table 3 and Table 4, mill rolls of biaxially oriented polyamide films were obtained in the same manner as in Example 5, except that: no preparatory longitudinal stretch was performed; and, regarding the main longitudinal stretch, two stages of stretches were performed with the temperatures and the ratios being set to the values indicated in Table 3.

Comparative Example 15

As indicated in Table 3 and Table 4, a mill roll of a biaxially oriented polyamide film was obtained in the same manner as in the example, except that: no preparatory longitudinal stretch was performed; and, regarding the main longitudinal stretch, one stage of stretch was performed with the temperature and the ratio being set to the values indicated in Table 3 and Table 4.

TABLE 3

|  |  |  | Example 5 | Example 6 | Example 7 | Example 8 | Comparative Example 8 | Comparative Example 9 | Comparative Example 11 |
|---|---|---|---|---|---|---|---|---|---|
| First stage of preparatory longitudinal stretch | Temperature | ° C. | 80 | 85 | 85 | 85 |  |  |  |
|  | Ratio | — | 1.03 | 1.02 | 1.07 | 1.07 |  |  |  |

TABLE 3-continued

| | | | | | | | | | |
|---|---|---|---|---|---|---|---|---|---|
| Second stage of preparatory longitudinal stretch | Temperature | °C. | 80 | 85 | | | | | |
| | Ratio | — | 1.03 | 1.02 | | | | | |
| First stage of main longitudinal stretch | Temperature | °C. | 85 | 85 | 85 | 85 | 75 | 85 | 80 |
| | Ratio | — | 2.1 | 2.0 | 2.0 | 2.0 | 1.7 | 2.1 | 1.7 |
| Second stage of main longitudinal stretch | Temperature | °C. | 75 | 75 | 75 | 75 | 70 | 70 | 70 |
| | Ratio | — | 1.5 | 1.6 | 1.4 | 1.4 | 2.0 | 1.6 | 1.8 |
| Total longitudinal stretch ratio | | — | 3.4 | 3.4 | 3.1 | 3.1 | 3.4 | 3.4 | 3.1 |
| Transverse stretch | Temperature | °C. | 130 | 130 | 130 | 130 | 130 | 130 | 130 |
| | Ratio | — | 4.0 | 4.0 | 4.0 | 4.0 | 4.0 | 4.0 | 4.0 |
| Heat setting temperature | | °C. | 210 | 210 | 210 | 210 | 210 | 210 | 195 |
| Relaxation temperature | | °C. | 210 | 210 | 210 | 210 | 210 | 210 | 195 |
| Relaxation rate | | % | 5.0 | 5.0 | 5.0 | 5.0 | 5.0 | 5.0 | 5.0 |
| Type of application liquid | | — | (A) | (A) | (A) | (A) | (A) | (A) | (A) |
| Thickness | | μm | 15 | 15 | 15 | 15 | 15 | 15 | 15 |
| Impact strength | | J/15 μm | 1.2 | 1.1 | 1.0 | 1.1 | 1.2 | 1.1 | 1.6 |
| Thermal shrinkage rate 160° C., 10 minutes | MD | % | 1.1 | 1.1 | 1.1 | 1.0 | 1.1 | 1.0 | 3.2 |
| | TD | % | 1.4 | 1.4 | 1.4 | 1.3 | 1.4 | 1.3 | 3.7 |
| Orientation angle | | degree | 26 | 24 | 21 | 22 | 26 | 25 | 21 |
| Strain at moisture absorption | | % | 1.2 | 1.1 | 0.7 | 0.9 | 1.5 | 1.6 | 1.1 |
| Strain at thermal shrinkage | | % | 1.7 | 1.8 | 1.6 | 1.5 | 2.0 | 1.8 | 1.2 |
| Water-Resistant Lamination Strength | | N/15 mm | 2.8 | 3.0 | 2.6 | 2.8 | 2.9 | 2.8 | 2.7 |
| S-shape curling | Visual evaluation | | B | B | A | A | C | C | C |

| | | | Comparative Example 12 | Comparative Example 13 | Comparative Example 14 | Comparative Example 15 |
|---|---|---|---|---|---|---|
| First stage of preparatory longitudinal stretch | Temperature | °C. | | | | |
| | Ratio | — | | | | |
| Second stage of preparatory longitudinal stretch | Temperature | °C. | | | | |
| | Ratio | — | | | | |
| First stage of main longitudinal stretch | Temperature | °C. | 80 | 70 | 80 | 70 |
| | Ratio | — | 1.7 | 1.7 | 1.7 | 3.3 |
| Second stage of main longitudinal stretch | Temperature | °C. | 70 | 70 | 65 | |
| | Ratio | — | 1.8 | 2.0 | 1.5 | |
| Total longitudinal stretch ratio | | — | 3.1 | 3.4 | 2.6 | 3.3 |
| Transverse stretch | Temperature | °C. | 130 | 130 | 130 | 130 |
| | Ratio | — | 4.0 | 4.0 | 4.0 | 4.0 |
| Heat setting temperature | | °C. | 215 | 210 | 210 | 210 |
| Relaxation temperature | | °C. | 215 | 210 | 210 | 210 |
| Relaxation rate | | % | 5.0 | 5.0 | 5.0 | 5.0 |
| Type of application liquid | | — | (A) | (A) | (A) | (A) |
| Thickness | | μm | 15 | 15 | 15 | 15 |
| Impact strength | | J/15 μm | 0.6 | 1.3 | 0.6 | 1.3 |
| Thermal shrinkage rate 160° C., 10 minutes | MD | % | 0.4 | 1.3 | 0.6 | 1.4 |
| | TD | % | 0.6 | 1.7 | 1.1 | 1.8 |
| Orientation angle | | degree | 27 | 28 | 21 | 26 |
| Strain at moisture absorption | | % | 1.8 | 2.0 | 0.8 | 1.8 |
| Strain at thermal shrinkage | | % | 2.3 | 2.1 | 1.4 | 2.3 |
| Water-Resistant Lamination Strength | | N/15 mm | 2.7 | 2.9 | 2.7 | 2.8 |
| S-shape curling | Visual evaluation | | C | C | B | C |

TABLE 4

| | | | Example 5 | Example 6 | Example 7 | Example 8 | Comparative Example 8 | Comparative Example 9 | Comparative Example 11 |
|---|---|---|---|---|---|---|---|---|---|
| First stage of preparatory longitudinal stretch | Temperature | °C. | 80 | 85 | 85 | 85 | | | |
| | Ratio | — | 1.03 | 1.02 | 1.07 | 1.07 | | | |
| Second stage of preparatory longitudinal stretch | Temperature | °C. | 80 | 85 | | | | | |
| | Ratio | — | 1.03 | 1.02 | | | | | |
| First stage of main longitudinal stretch | Temperature | °C. | 85 | 85 | 85 | 85 | 75 | 85 | 80 |
| | Ratio | — | 2.1 | 2.0 | 2.0 | 2.0 | 1.7 | 2.1 | 1.7 |
| Second stage of main longitudinal stretch | Temperature | °C. | 75 | 75 | 75 | 75 | 70 | 70 | 70 |
| | Ratio | — | 1.5 | 1.6 | 1.4 | 1.4 | 2.0 | 1.6 | 1.8 |
| Total longitudinal stretch ratio | | — | 3.4 | 3.4 | 3.1 | 3.1 | 3.4 | 3.4 | 3.1 |
| Heat setting temperature | | °C. | 210 | 210 | 210 | 210 | 210 | 210 | 195 |
| Relaxation temperature | | °C. | 210 | 210 | 210 | 210 | 210 | 210 | 195 |
| Relaxation rate | | % | 5.0 | 5.0 | 5.0 | 5.0 | 5.0 | 5.0 | 5.0 |
| Type of application liquid | | — | (A) | (A) | (A) | (A) | (A) | (A) | (A) |
| Thickness | Right side | μm | 15 | 15 | 15 | 15 | 15 | 15 | 15 |
| | Left side | | 15 | 15 | 15 | 15 | 15 | 15 | 15 |
| Impact strength | Right side | J/15μ | 1.1 | 1.2 | 1.1 | 1.2 | 1.2 | 1.1 | 1.4 |
| | Left side | | 1.1 | 1.2 | 1.0 | 1.1 | 1.2 | 1.0 | 1.4 |

TABLE 4-continued

| | | | | | | | | |
|---|---|---|---|---|---|---|---|---|
| Strain at moisture absorption | Right side | % | 1.2 | 1.1 | 0.9 | 0.7 | 1.5 | 1.7 | 1.2 |
| | Left side | | 1.3 | 1.2 | 0.8 | 0.8 | 1.5 | 1.6 | 1.1 |
| Thermal shrinkage rate at MD direction 160° C., 10 minutes | Right side | % | 1.0 | 1.0 | 1.0 | 1.0 | 1.2 | 1.0 | 3.3 |
| | Left side | | 1.1 | 1.1 | 1.2 | 1.1 | 1.3 | 1.0 | 3.5 |
| Thermal shrinkage rate at TD direction 160° C., 10 minutes | Right side | % | 1.5 | 1.3 | 1.4 | 1.3 | 1.4 | 1.3 | 3.8 |
| | Left side | | 1.3 | 1.4 | 1.4 | 1.3 | 1.5 | 1.2 | 3.9 |
| Strain at thermal shrinkage | Right side | % | 1.9 | 1.9 | 1.6 | 1.4 | 2.3 | 2.0 | 1.4 |
| | Left side | | 1.8 | 1.7 | 1.7 | 1.5 | 2.1 | 1.9 | 1.4 |
| Water-Resistant Lamination Strength | Right side | N/15 mm | 2.7 | 2.9 | 2.7 | 2.9 | 3.0 | 2.7 | 2.9 |
| | Left side | | 2.8 | 2.8 | 2.7 | 2.9 | 2.8 | 2.8 | 3.0 |
| S-shape curling | Visual evaluation | | B | B | A | A | C | C | C |

| | | | Comparative Example 12 | Comparative Example 13 | Comparative Example 14 | Comparative Example 15 |
|---|---|---|---|---|---|---|
| First stage of preparatory longitudinal stretch | Temperature | ° C. | | | | |
| | Ratio | | — | | | |
| Second stage of preparatory longitudinal stretch | Temperature | ° C. | | | | |
| | Ratio | | — | | | |
| First stage of main longitudinal stretch | Temperature | ° C. | 80 | 70 | 80 | 70 |
| | Ratio | | 1.7 | 1.7 | 1.7 | 3.3 |
| Second stage of main longitudinal stretch | Temperature | ° C. | 70 | 70 | 65 | |
| | Ratio | | 1.8 | 2.0 | 1.5 | |
| Total longitudinal stretch ratio | | | 3.1 | 3.4 | 2.6 | 3.3 |
| Heat setting temperature | | ° C. | 215 | 210 | 210 | 210 |
| Relaxation temperature | | ° C. | 215 | 210 | 210 | 210 |
| Relaxation rate | | % | 5.0 | 5.0 | 5.0 | 5.0 |
| Type of application liquid | | — | (A) | (A) | (A) | (A) |
| Thickness | Right side | μm | 15 | 15 | 15 | 15 |
| | Left side | | 15 | 15 | 15 | 15 |
| Impact strength | Right side | J/15μ | 0.6 | 1.3 | 0.7 | 1.1 |
| | Left side | | 0.7 | 1.4 | 0.7 | 1.1 |
| Strain at moisture absorption | Right side | % | 1.6 | 2.1 | 0.6 | 1.8 |
| | Left side | | 1.8 | 2.1 | 0.7 | 1.8 |
| Thermal shrinkage rate at MD direction 160° C., 10 minutes | Right side | % | 0.5 | 1.4 | 0.6 | 1.3 |
| | Left side | | 0.4 | 1.3 | 0.6 | 1.4 |
| Thermal shrinkage rate at TD direction 160° C., 10 minutes | Right side | % | 0.6 | 1.8 | 1.0 | 1.8 |
| | Left side | | 0.5 | 2.0 | 1.0 | 1.7 |
| Strain at thermal shrinkage | Right side | % | 2.3 | 2.1 | 1.3 | 2.4 |
| | Left side | | 2.3 | 2.0 | 1.4 | 2.2 |
| Water-Resistant Lamination Strength | Right side | N/15 mm | 2.8 | 2.9 | 2.8 | 2.6 |
| | Left side | | 2.8 | 2.7 | 2.9 | 2.9 |
| S-shape curling | Visual evaluation | | C | C | B | C |

As indicated in Table 3, even though the biaxially oriented polyamide films of the invention of the present application in Examples 5 to 8 were slit rolls at the ends of the mill rolls, when the biaxially oriented polyamide films were made into bags, occurrence of S-shape curling was within a permissible range. In addition, since each biaxially oriented polyamide film includes the easily adhesive layer formed of the acrylic graft copolymerized polyester, the lamination strength of the layered film of the sealant film and the polyamide film was also favorable.

Meanwhile, the biaxially oriented polyamide films obtained in comparative examples other than Comparative Example 3-3 and Comparative Example 6 each had a molecular orientation angle larger than 20° and a strain at moisture absorption higher than 1.3%. Thus, when the biaxially oriented polyamide films were made into bags, impermissible amounts of S-shape curling occurred.

The biaxially oriented polyamide film obtained in Comparative Example 3 had a molecular orientation angle larger than 20° and a strain at moisture absorption not higher than 1.3%, but had a high heat shrinkage rate after heating for ten minutes at 160° C. Thus, when the biaxially oriented polyamide film was made into a bag, an impermissible amount of S-shape curling occurred, and a heat-sealed portion of the bag experienced shrinkage deformation.

The biaxially oriented polyamide films obtained in Comparative Examples 3-6 had a strain at moisture absorption not higher than 1.3% and also experienced S-shape curling within a permissible range, but had a low impact strength. Thus, characteristics of a polyamide film required to have impact resistance were not satisfied.

As indicated in Table 4, regarding the biaxially oriented polyamide films of the invention of the present application in Examples 5 to 8, even when the slit rolls at the ends thereof were made into bags, occurrence of S-shape curling was within a permissible range. In addition, since each biaxially oriented polyamide film includes the easily adhesive layer formed of the acrylic graft copolymerized polyester, the lamination strength of the layered film of the sealant film and the polyamide film was also favorable.

Meanwhile, each of the polyamide film mill rolls obtained in the comparative examples other than Comparative Example 11 and Comparative Example 14, at each of the positions thereof that were inward by 300 mm from the right end and the left end in the transverse direction of the film, had a strain at moisture absorption higher than 1.3%. Thus, when the polyamide film mill rolls were made into bags, impermissible amounts of S-shape curling occurred.

The polyamide film mill roll obtained in Comparative Example 11, at each of the positions thereof that were inward by 300 mm from the right end and the left end in the transverse direction of the film, had a strain at moisture absorption not higher than 1.3% but had a high heat shrinkage rate after heating for ten minutes at 160° C. Thus, when the polyamide film mill roll was made into a bag, an impermissible amount of S-shape curling occurred, and a heat-sealed portion of the bag experienced shrinkage deformation.

The polyamide film mill roll obtained in Comparative Example 14, at each of the positions thereof that were inward by 300 mm from the right end and the left end in the transverse direction of the film, had a strain at moisture absorption not higher than 1.3% and also experienced S-shape curling within a permissible range, but had a low impact strength. Thus, characteristics of a polyamide film required to have impact resistance were not satisfied.

Example 9 to Example 12

Mill rolls of biaxially oriented polyamide films were obtained in the same manner as in Example 5, except that: the coating liquid was changed from the water-based dispersion (A) to the water-based dispersion (B) of the polyurethane resin; and film forming conditions indicated in Table 5 were employed. The coating amount of the polyurethane resin to each of the obtained biaxially oriented polyamide films was 0.05 g/m$^2$ in terms of solid content.

Comparative Example 16

A biaxially oriented polyamide film was obtained in the same manner as in Comparative Example 8, except that the coating liquid was changed from the water-based dispersion (A) to the water-based dispersion (B) of the polyurethane resin. That is, the biaxially oriented polyamide film was obtained by: performing no preparatory longitudinal stretch; and, regarding the main longitudinal stretch, performing two stages of stretches with the temperatures and the ratios being set to the values indicated in Table 5 and Table 6.

Reference Example 1

A mill roll of a biaxially oriented polyamide film was obtained in the same manner as in Example 5, except that no coating liquid was coated.

TABLE 5

|  |  |  | Example 9 | Example 10 | Example 11 | Example 12 | Comparative Example 16 | Reference Example 1 |
|---|---|---|---|---|---|---|---|---|
| First stage of preparatory | Temperature | ° C. | 80 | 85 | 85 | 85 |  | 80 |
| longitudinal stretch | Ratio | — | 1.03 | 1.02 | 1.07 | 1.07 |  | 1.03 |
| Second stage of preparatory | Temperature | ° C. | 80 | 85 |  |  |  | 80 |
| longitudinal stretch | Ratio | — | 1.03 | 1.02 |  |  |  | 1.03 |
| First stage of main | Temperature | ° C. | 85 | 85 | 85 | 85 | 75 | 85 |
| longitudinal stretch | Ratio | — | 2.1 | 2.0 | 2.0 | 2.0 | 1.7 | 2.1 |
| Second stage of main | Temperature | ° C. | 75 | 75 | 75 | 75 | 70 | 75 |
| longitudinal stretch | Ratio | — | 1.5 | 1.6 | 1.4 | 1.4 | 2.0 | 1.5 |
| Total longitudinal stretch ratio |  | — | 3.4 | 3.4 | 3.1 | 3.1 | 3.4 | 3.4 |
| Transverse stretch | Temperature | ° C. | 130 | 130 | 130 | 130 | 130 | 130 |
|  | Ratio | — | 4.0 | 4.0 | 4.0 | 4.0 | 4.0 | 4.0 |
| Heat setting temperature |  | ° C. | 210 | 210 | 210 | 210 | 210 | 210 |
| Relaxation temperature |  | ° C. | 210 | 210 | 210 | 210 | 210 | 210 |
| Relaxation rate |  | % | 5.0 | 5.0 | 5.0 | 5.0 | 5.0 | 5.0 |
| Type of application liquid |  | — | (B) | (B) | (B) | (B) | (B) |  |
| Thickness |  | μm | 15 | 15 | 15 | 15 | 15 | 15 |
| Impact strength |  | J/15 μm | 1.1 | 1.2 | 1.1 | 1.1 | 1.2 | 1.2 |
| Thermal shrinkage rate | MD | % | 1.1 | 1.0 | 1.1 | 1.0 | 1.3 | 1.1 |
| 160° C., 10 minutes | TD | % | 1.5 | 1.3 | 1.3 | 1.3 | 1.5 | 1.4 |
| Orientation angle |  | degree | 26 | 24 | 21 | 22 | 26 | 25 |
| Strain at moisture absorption |  | % | 1.1 | 1.0 | 0.8 | 0.9 | 1.5 | 1.2 |
| Strain at thermal shrinkage |  | % | 1.7 | 1.7 | 1.5 | 1.5 | 2.1 | 1.8 |
| Water-Resistant Lamination Strength |  | N/15 mm | 2.6 | 2.5 | 2.6 | 2.5 | 2.8 | 0.8 |
| S-shape curling | Visual evaluation |  | B | B | A | A | C | B |

TABLE 6

|  |  |  |  | Example 9 | Example 10 | Example 11 | Example 12 | Comparative Example 16 | Reference Example 1 |
|---|---|---|---|---|---|---|---|---|---|
| First stage of preparatory | Temperature |  | ° C. | 80 | 85 | 85 | 85 |  | 80 |
| longitudinal stretch | Ratio |  | — | 1.03 | 1.02 | 1.07 | 1.07 |  | 1.03 |
| Second stage of preparatory | Temperature |  | ° C. | 80 | 85 |  |  |  | 80 |
| longitudinal stretch | Ratio |  | — | 1.03 | 1.02 |  |  |  | 1.03 |
| First stage of main | Temperature |  | ° C. | 85 | 85 | 85 | 85 | 75 | 85 |
| longitudinal stretch | Ratio |  | — | 2.1 | 2.0 | 2.0 | 2.0 | 1.7 | 2.1 |
| Second stage of main | Temperature |  | ° C. | 75 | 75 | 75 | 75 | 70 | 75 |
| longitudinal stretch | Ratio |  | — | 1.5 | 1.6 | 1.4 | 1.4 | 2.0 | 1.5 |
| Total longitudinal stretch ratio |  |  | — | 3.4 | 3.4 | 3.1 | 3.1 | 3.4 | 3.4 |
| Heat setting temperature |  |  | ° C. | 210 | 210 | 210 | 210 | 210 | 210 |
| Relaxation temperature |  |  | ° C. | 210 | 210 | 210 | 210 | 210 | 210 |
| Relaxation rate |  |  | % | 5.0 | 5.0 | 5.0 | 5.0 | 5.0 | 5.0 |
| Type of application liquid |  |  | — | (B) | (B) | (B) | (B) | (B) |  |
| Thickness | Right side |  | μm | 15 | 15 | 15 | 15 | 15 | 15 |
|  | Left side |  |  | 15 | 15 | 15 | 15 | 15 | 15 |
| Impact strength | Right side |  | J/15 μm | 1.2 | 1.2 | 1.0 | 1.2 | 1.1 | 1.2 |
|  | Left side |  |  | 1.2 | 1.1 | 1.1 | 1.2 | 1.2 | 1.1 |

TABLE 6-continued

|  |  |  | Example 9 | Example 10 | Example 11 | Example 12 | Comparative Example 16 | Reference Example 1 |
|---|---|---|---|---|---|---|---|---|
| Strain at moisture absorption | Right side | % | 1.1 | 1.0 | 0.8 | 0.8 | 1.4 | 1.3 |
|  | Left side |  | 1.1 | 1.1 | 0.9 | 0.8 | 1.5 | 1.2 |
| Thermal shrinkage rate at MD direction | Right side | % | 1.0 | 1.0 | 1.1 | 1.1 | 1.3 | 1.1 |
| 160° C., 10 minutes | Left side |  | 1.1 | 1.1 | 1.0 | 1.2 | 1.2 | 1.0 |
| Thermal shrinkage rate at TD direction | Right side | % | 1.5 | 1.4 | 1.4 | 1.1 | 1.5 | 1.3 |
| 160° C., 10 minutes | Left side |  | 1.5 | 1.4 | 1.3 | 1.3 | 1.6 | 1.5 |
| Strain at thermal shrinkage | Right side | % | 1.8 | 1.7 | 1.6 | 1.5 | 2.3 | 1.9 |
|  | Left side |  | 1.8 | 1.7 | 1.5 | 1.5 | 2.1 | 1.8 |
| Water-Resistant Lamination | Right side | N/15 mm | 2.7 | 2.6 | 2.6 | 2.6 | 2.7 | 1.1 |
| Strength | Left side |  | 2.6 | 2.6 | 2.8 | 2.6 | 2.6 | 1.0 |
| S-shape curling | Visual evaluation |  | B | B | A | A | C | B |

As indicated in Table 5, even though the biaxially oriented polyamide films of the invention of the present application in Examples 9 to 12 were slit rolls at the ends of the mill rolls, when the biaxially oriented polyamide films were made into bags, occurrence of S-shape curling was within a permissible range. In addition, since each biaxially oriented polyamide film includes the easily adhesive layer formed of the polyurethane resin, the lamination strength of the layered film of the sealant film and the polyamide film was also favorable.

Meanwhile, the biaxially oriented polyamide film obtained in Comparative Example 16 had a molecular orientation angle larger than 20° and a strain at moisture absorption higher than 1.3%. Thus, when the biaxially oriented polyamide film was made into a bag, an impermissible amount of S-shape curling occurred.

Further, the biaxially oriented polyamide film obtained in Reference Example 1 had a molecular orientation angle and a strain at moisture absorption that were within the range of the present invention. Thus, when the biaxially oriented polyamide film was made into a bag, occurrence of S-shape curling was within a permissible range. However, since the biaxially oriented polyamide film includes no easily adhesive layer, the lamination strength of the layered film of the sealant film and the polyamide film was insufficient.

As indicated in Table 6, regarding the polyamide film mill rolls of the invention of the present application in Examples 9 to 12, even when the slit rolls at the ends thereof were made into bags, occurrence of S-shape curling was within a permissible range. In addition, since each polyamide film mill roll includes the easily adhesive layer formed of the polyurethane resin, the lamination strength of the layered film of the sealant film and the polyamide film was also favorable.

Meanwhile, the polyamide film mill roll obtained in Comparative Example 16, at each of the positions thereof that were inward by 300 mm from the right end and the left end in the transverse direction of the film, had a strain at moisture absorption higher than 1.3%. Thus, when the polyamide film mill roll was made into a bag, an impermissible amount of S-shape curling occurred.

Further, the polyamide film mill roll obtained in Reference Example 1, at each of the positions thereof that were inward by 300 mm from the right end and the left end in the transverse direction of the film, had a strain at moisture absorption not higher than 1.3%, and, when the polyamide film mill roll was made into a bag, occurrence of S-shape curling was within a permissible range. However, since the polyamide film mill roll includes no easily adhesive layer, the lamination strength of the layered film of the sealant film and the polyamide film was insufficient.

INDUSTRIAL APPLICABILITY

The biaxially oriented polyamide film of the present invention, even as a product that is close to an end of a mill roll, has favorable mechanical characteristics and thermal characteristics, and experiences few S-shape curling due to moisture absorption after being made into a bag. Thus, when the bag is filled with content, a malfunction is less likely to occur at conveyance of the bag or the like, and workability is favorable. Furthermore, a shrinkage strain at high temperature is also low, and thus shrinkage deformation after the bag is heat-sealed is also low. Moreover, in the case of providing an easily adhesive layer, the bag has a high lamination strength and thus is less likely to be torn. Therefore, the present invention can be suitably used for various kinds of packaging purposes.

The invention claimed is:

1. A biaxially oriented polyamide film formed of a polyamide resin containing not lower than 60% by mass of polyamide 6, wherein
   a molecular orientation angle of the film is not smaller than 20°,
   a strain at moisture absorption of the film is not higher than 1.3%,
   an impact strength of the film is not lower than 0.8 J/15 µm, and
   a heat shrinkage rate, after heating for ten minutes at 160° C., of the film is 0.6 to 3.0% in both an MD direction and a TD direction.

2. The biaxially oriented polyamide film according to claim 1, wherein the biaxially oriented polyamide film is formed of a polyamide resin containing not lower than 90% by mass of polyamide 6.

3. The biaxially oriented polyamide film according to claim 2, wherein a strain at thermal shrinkage, after heating for ten minutes at 160° C., of the film is not higher than 2.0%.

4. The biaxially oriented polyamide film according to claim 3, wherein the biaxially oriented polyamide film comprises, on at least one surface thereof, an easily adhesive layer having a coating amount of 0.01 to 3 g/m² in terms of solid content and formed of any of a polyester resin, a polyurethane resin, and/or a polyacrylic resin.

5. The biaxially oriented polyamide film according to claim 1, wherein a strain at thermal shrinkage, after heating for ten minutes at 160° C., of the film is not higher than 2.0%.

6. The biaxially oriented polyamide film according to claim 1, wherein the biaxially oriented polyamide film comprises, on at least one surface thereof, an easily adhesive layer having a coating amount of 0.01 to 3 g/m² in terms of solid content and formed of any of a polyester resin, a polyurethane resin, and/or a polyacrylic resin.

7. A polyamide film mill roll of a biaxially oriented polyamide film formed of a polyamide resin containing not lower than 60% by mass of polyamide 6, wherein
- an impact strength at each of positions of the film that are inward by 300 mm from a right end and a left end in a transverse direction of the film mill roll is not lower than 0.8 J/15 μm,
- a strain at moisture absorption at each position is not higher than 1.3%, and
- a heat shrinkage rate, after heating for ten minutes at 160° C., at each position is 0.6 to 3.0% in both an MD direction and a TD direction.

8. The polyamide film mill roll according to claim 7, wherein the biaxially oriented polyamide film comprises, on at least one surface thereof, an easily adhesive layer having a coating amount of 0.01 to 3 g/m² in terms of solid content and formed of any of a polyester resin, a polyurethane resin, and/or a polyacrylic resin.

9. The polyamide film mill roll according to claim 8, wherein a strain at thermal shrinkage, after heating for ten minutes at 160° C., at each of the positions of the film that are inward by 300 mm from the right end and the left end in the transverse direction of the film mill roll is not higher than 2.0%.

10. The polyamide film mill roll according to claim 7, wherein a strain at thermal shrinkage, after heating for ten minutes at 160° C., at each of the positions of the film that are inward by 300 mm from the right end and the left end in the transverse direction of the film mill roll is not higher than 2.0%.

* * * * *